US012792277B2

(12) United States Patent
Hamada

(10) Patent No.: US 12,792,277 B2
(45) Date of Patent: Nov. 10, 2026

(54) INFORMATION PROCESSING APPARATUS AND METHOD OF CONTROLLING THE SAME, AND STORAGE MEDIUM

(71) Applicant: CANON KABUSHIKI KAISHA, Tokyo (JP)

(72) Inventor: Yoshinobu Hamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 18/616,532

(22) Filed: Mar. 26, 2024

(65) Prior Publication Data

US 2024/0329890 A1 Oct. 3, 2024

(30) Foreign Application Priority Data

Apr. 3, 2023 (JP) ................................ 2023-060441

(51) Int. Cl.
*G06F 15/00* (2006.01)
*G06F 3/12* (2006.01)

(52) U.S. Cl.
CPC .......... *G06F 3/1205* (2013.01); *G06F 3/1255* (2013.01); *G06F 3/1258* (2013.01); *G06F 3/1285* (2013.01)

(58) Field of Classification Search
USPC ........................................................ 358/1.15
See application file for complete search history.

(56) References Cited

U.S. PATENT DOCUMENTS 10,990,333 B1 * 4/2021 Murugan .............. G06F 3/1253
11,461,064 B2 10/2022 Inoue
11,847,373 B2 12/2023 Inoue
2020/0133591 A1 * 4/2020 Kaneda .................. G06F 3/122
2021/0240412 A1 8/2021 Saigusa
2021/0240415 A1 * 8/2021 Saigusa ................. G06F 3/1232
2024/0086129 A1 3/2024 Inoue

FOREIGN PATENT DOCUMENTS

JP 2018-147217 A 9/2018
JP 2021-124791 A 8/2021
JP 2021-170258 A 10/2021

OTHER PUBLICATIONS

Japanese Office Action dated Jun. 17, 2024, in Japanese Patent Application No. 2024-087243.

* cited by examiner

*Primary Examiner* — Mark R Milia
(74) *Attorney, Agent, or Firm* — VENABLE LLP

(57) ABSTRACT

An information processing apparatus updates device capability information stored in advance in an operating system with capability information obtained from a printer, so the device capability includes information regarding an output paper size and a document size. Output paper size information is based on a paper size capability obtained from the printer, and document size information uses predetermined information including a paper size not included in the capability information. The information processing apparatus also receives setting of print setting information based on the updated device capability information from a user, the print setting information including settings regarding an output media size and a document size, obtains intermediate data generated by the operating system based on the print setting information, and generates print data based on the intermediate data, the intermediate data being data of the document size, and the print data being data of the output paper size.

14 Claims, 33 Drawing Sheets

FIG. 5

| | ITEM NAME | ATTRIBUTE VALUE |
|---|---|---|
| | PAPER SIZE | A3 / A4 / A5 / B4 / B5 / Letter |
| | PAPER TYPE | ENVELOPE / LABEL / PHOTO PAPER / PHOTO PAPER, GLOSSY STANDARD / PHOTO PAPER, SEMI-GLOSS / INKJET POSTCARD (MESSAGE SIDE) / INKJET POSTCARD (ADDRESS SIDE) / INKJET PHOTO POSTCARD (MESSAGE SIDE) / INKJET PHOTO POSTCARD (ADDRESS SIDE) |
| | NUMBER OF COPIES | Max = 99 |
| | PAPER ORIENTATION | VERTICAL / HORIZONTAL |
| | PRINT QUALITY | STANDARD / DRAFT |
| | COLLATING | ON / OFF |
| | STAPLE | NONE / AUTOMATIC / TOP LEFT / BOTTOM LEFT / TOP RIGHT / BOTTOM RIGHT / LEFT SIDE (TWO POINT STAPLING) / TOP SIDE (TWO POINT STAPLING) / RIGHT SIDE (TWO POINT STAPLING) / BOTTOM SIDE (TWO POINT STAPLING) / SADDLE STITCHING / STAPLELESS BINDING |
| | PUNCH | NONE / PUNCH HOLE (AUTOMATIC) / PUNCH HOLE (TWO HOLES LEFT) / PUNCH HOLE (THREE HOLES LEFT) / PUNCH HOLE (FOUR HOLES LEFT) / PUNCH HOLE (MULTIPLE LEFT) / PUNCH HOLE (TWO HOLES RIGHT) / PUNCH HOLE (THREE HOLES RIGHT) / PUNCH HOLE (FOUR HOLES RIGHT) / PUNCH HOLE (MULTIPLE RIGHT) / PUNCH HOLE (TWO HOLES TOP) / PUNCH HOLE (THREE HOLES TOP) / PUNCH HOLE (FOUR HOLES TOP) / PUNCH HOLE (MULTIPLE TOP) / PUNCH HOLE (TWO HOLES BOTTOM) / PUNCH HOLE (THREE HOLES BOTTOM) / PUNCH HOLE (FOUR HOLES BOTTOM) / PUNCH HOLE (MULTIPLE BOTTOM) |
| | FOLDING SETTING | NONE / TWO FOLD / C FOLD / FOUR FOLD / Z FOLD / SADDLE FOLD (OUTPUT FROM SADDLE FINISHER) |
| | COLOR MODE | COLOR / MONOCHROME |
| | PAGE AGGREGATION | OFF / 2 in 1 / 4 in 1 / 6 in 1 / 9 in 1 / 16 in 1 |
| | PAGE LAYOUT | LEFT TO RIGHT / RIGHT TO LEFT |
| | SCALING | NONE / FIT-TO-PAGE-WIDTH / FIT-TO-SCREEN-SIZE |
| | DOUBLE-SIDED PRINTING | SINGLE-SIDED/DOUBLE-SIDED |
| | STAPLING SIDE | LONG-SIDE STAPLING / SHORT-SIDE STAPLING |
| | 180-DEGREE ROTATION | NONE / ROTATE LEFT / ROTATE RIGHT |
| 501 | HANDLE SIZE-MIXED PRINTING IN SINGLE JOB | ON / OFF |
| 502 | STORE JOB IN PRINTER | ON / OFF |
| 503 | JOB NAME ABBREVIATION | ON / OFF |
| | SWITCH LANGUAGES | JAPANESE / English / French / German / Italian / Spanish / Portuguese / Dutch / Danish / Norwegian / Swedish / Finnish / Polish / Czech / Russian / Turkish / Chinese (Simplified) / Chinese (Traditional) / Korean / Thai / Indonesian |

FIG. 6A

601

```
<?xml version=“1.0” encoding=“utf-8”?>
<PrintDeviceCapabilities
 xmlns:xsi=“http://www.w3.org/2001/XMLSchema-instance”
 xmlns:xsd=“http://www.w3.org/2001/XMLSchema”
 xmlns:xml=“http://www.w3.org/XML/1998/namespace”
 xmlns:psk=“http://schemas.microsoft.com/windows/2003/08/printing/printschemakeywords”
 xmlns:psk12=“http://schemas.microsoft.com/windows/2013/12/printing/printschemakeywordsv12”
 xmlns:psf=“http://schemas.microsoft.com/windows/2003/08/printing/printschemaframework”
 xmlns:psf2=“http://schemas.microsoft.com/windows/2013/12/printing/printschemaframework2”
 xmlns=“http://schemas.microsoft.com/windows/2013/12/printing/printschemaframework2”
 version=“2”>

        ....................

  <psf:Feature name=“psk:PageMediaSize”>
    <psf:Property name=“psf:SelectionType”>
      <psf:Value xsi:type=“xsd:QName”>psk:PickOne</psf:Value>
    </psf:Property>
    <psf:Option name=“psk:ISOA4” constrained=“psk:None”>
      <psf:ScoredProperty name=“psk:MediaSizeWidth”>
        <psf:Value xsi:type=“xsd:integer”>210000</psf:Value>
      </psf:ScoredProperty>
      <psf:ScoredProperty name=“psk:MediaSizeHeight”>
        <psf:Value xsi:type=“xsd:integer”>297000</psf:Value>
      </psf:ScoredProperty>
      <psf:Property name=“psk:DisplayName”>
        <psf:Value xsi:type=“xsd:string”>A4</psf:Value>
      </psf:Property>
    </psf:Option>
    <psf:Option name=“psk:NorthAmericaLetter” constrained=“psk:None”>
      <psf:ScoredProperty name=“psk:MediaSizeWidth”>
        <psf:Value xsi:type=“xsd:integer”>215900</psf:Value>
      </psf:ScoredProperty>
      <psf:ScoredProperty name=“psk:MediaSizeHeight”>
        <psf:Value xsi:type=“xsd:integer”>279400</psf:Value>
      </psf:ScoredProperty>
      <psf:Property name=“psk:DisplayName”>
        <psf:Value xsi:type=“xsd:string”>Letter</psf:Value>
      </psf:Property>
    </psf:Option>
  </psf:Feature>

        ....................

</PrintDeviceCapabilities>
```

FIG. 6B

```
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

        ....................

   <psf:Feature name="psk:PageMediaSize">
     <psf:Property name="psf:SelectionType">
       <psf:Value xsi:type="xsd:QName">psk:PickOne</psf:Value>
     </psf:Property>
     <psf:Option name="psk:ISOA4" constrained="psk:None">
       <psf:ScoredProperty name="psk:MediaSizeWidth">
         <psf:Value xsi:type="xsd:integer">210000</psf:Value>
       </psf:ScoredProperty>
       <psf:ScoredProperty name="psk:MediaSizeHeight">
         <psf:Value xsi:type="xsd:integer">297000</psf:Value>
       </psf:ScoredProperty>
       <psf:Property name="psk:DisplayName">
         <psf:Value xsi:type="xsd:string">A4</psf:Value>
       </psf:Property>
     </psf:Option>
     <psf:Option name="psk:NorthAmericaLetter" constrained="psk:None">
       <psf:ScoredProperty name="psk:MediaSizeWidth">
         <psf:Value xsi:type="xsd:integer">215900</psf:Value>
       </psf:ScoredProperty>
       <psf:ScoredProperty name="psk:MediaSizeHeight">
         <psf:Value xsi:type="xsd:integer">279400</psf:Value>
       </psf:ScoredProperty>
       <psf:Property name="psk:DisplayName">
         <psf:Value xsi:type="xsd:string">Letter</psf:Value>
       </psf:Property>
     </psf:Option>
```

FIG. 6C

602

```
        <psf:Option name=“psk:ISOA3” constrained=“psk:None”>
            <psf:ScoredProperty name=“psk:MediaSizeWidth”>
                <psf:Value xsi:type=“xsd:integer”>297000</psf:Value>
            </psf:ScoredProperty>
            <psf:ScoredProperty name=“psk:MediaSizeHeight”>
                <psf:Value xsi:type=“xsd:integer”>420000</psf:Value>
            </psf:ScoredProperty>
            <psf:Property name=“psk:DisplayName”>
                <psf:Value xsi:type=“xsd:string”>A3</psf:Value>
            </psf:Property>
        </psf:Option>
        <psf:Option name=“psk:ISOA5” constrained=“psk:None”>
            <psf:ScoredProperty name=“psk:MediaSizeWidth”>
                <psf:Value xsi:type=“xsd:integer”>148000</psf:Value>
            </psf:ScoredProperty>
            <psf:ScoredProperty name=“psk:MediaSizeHeight”>
                <psf:Value xsi:type=“xsd:integer”>210000</psf:Value>
            </psf:ScoredProperty>
            <psf:Property name=“psk:DisplayName”>
                <psf:Value xsi:type=“xsd:string”>A5</psf:Value>
            </psf:Property>
        </psf:Option>
        <psf:Option name=“psk:JISB4” constrained=“psk:None”>
            <psf:ScoredProperty name=“psk:MediaSizeWidth”>
                <psf:Value xsi:type=“xsd:integer”>257000</psf:Value>
            </psf:ScoredProperty>
            <psf:ScoredProperty name=“psk:MediaSizeHeight”>
                <psf:Value xsi:type=“xsd:integer”>364000</psf:Value>
            </psf:ScoredProperty>
            <psf:Property name=“psk:DisplayName”>
                <psf:Value xsi:type=“xsd:string”>B4</psf:Value>
            </psf:Property>
        </psf:Option>
        <psf:Option name=“psk:JISB5” constrained=“psk:None”>
            <psf:ScoredProperty name=“psk:MediaSizeWidth”>
            <psf:Value xsi:type=“xsd:integer”>182000</psf:Value>
            </psf:ScoredProperty>
            <psf:ScoredProperty name=“psk:MediaSizeHeight”>
            <psf:Value xsi:type=“xsd:integer”>257000</psf:Value>
            </psf:ScoredProperty>
            <psf:Property name=“psk:DisplayName”>
            <psf:Value xsi:type=“xsd:string”>B5</psf:Value>
            </psf:Property>
        </psf:Option>
    </psf:Feature>

            ......................

</PrintDeviceCapabilities>
```

FIG. 7

700

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

701

702

FIG. 10A

```
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

        ......................

1001 <psf:Feature name="psk:PageMediaSize">
       <psf:Property name="psf:SelectionType">
         <psf:Value xsi:type="xsd:QName">psk:PickOne</psf:Value>
       </psf:Property>
           <psf:Property name="psk:DisplayName">
             <psf:Value xsi:type="xsd:string">DOCUMENT SIZE</psf:Value>
           </psf:Property>
       <psf:Option name="psk:ISOA3" constrained="psk:None">
         <psf:ScoredProperty name="psk:MediaSizeWidth">
           <psf:Value xsi:type="xsd:integer">297000</psf:Value>
         </psf:ScoredProperty>
         <psf:ScoredProperty name="psk:MediaSizeHeight">
           <psf:Value xsi:type="xsd:integer">420000</psf:Value>
         </psf:ScoredProperty>
         <psf:Property name="psk:DisplayName">
           <psf:Value xsi:type="xsd:string">A3</psf:Value>
         </psf:Property>
       </psf:Option>
       <psf:Option name="psk:ISOA4" constrained="psk:None">
         <psf:ScoredProperty name="psk:MediaSizeWidth">
           <psf:Value xsi:type="xsd:integer">210000</psf:Value>
         </psf:ScoredProperty>
         <psf:ScoredProperty name="psk:MediaSizeHeight">
           <psf:Value xsi:type="xsd:integer">297000</psf:Value>
         </psf:ScoredProperty>
         <psf:Property name="psk:DisplayName">
           <psf:Value xsi:type="xsd:string">A4</psf:Value>
         </psf:Property>
       </psf:Option>
```

FIG. 10B

1001

```
<psf:Option name=“psk:ISOA5” constrained=“psk:None”>
  <psf:ScoredProperty name=“psk:MediaSizeWidth”>
    <psf:Value xsi:type=“xsd:integer”>148000</psf:Value>
  </psf:ScoredProperty>
  <psf:ScoredProperty name=“psk:MediaSizeHeight”>
    <psf:Value xsi:type=“xsd:integer”>210000</psf:Value>
  </psf:ScoredProperty>
  <psf:Property name=“psk:DisplayName”>
    <psf:Value xsi:type=“xsd:string”>A5</psf:Value>
  </psf:Property>
</psf:Option>
<psf:Option name=“psk:ISOA2” constrained=“psk:None”>
  <psf:ScoredProperty name=“psk:MediaSizeWidth”>
    <psf:Value xsi:type=“xsd:integer”>420000</psf:Value>
  </psf:ScoredProperty>
  <psf:ScoredProperty name=“psk:MediaSizeHeight”>
    <psf:Value xsi:type=“xsd:integer”>594000</psf:Value>
  </psf:ScoredProperty>
  <psf:Property name=“psk:DisplayName”>
    <psf:Value xsi:type=“xsd:string”>A2</psf:Value>
  </psf:Property>
</psf:Option>
<psf:Option name=“psk:ISOA1” constrained=“psk:None”>
  <psf:ScoredProperty name=“psk:MediaSizeWidth”>
    <psf:Value xsi:type=“xsd:integer”>594000</psf:Value>
  </psf:ScoredProperty>
  <psf:ScoredProperty name=“psk:MediaSizeHeight”>
    <psf:Value xsi:type=“xsd:integer”>841000</psf:Value>
  </psf:ScoredProperty>
  <psf:Property name=“psk:DisplayName”>
    <psf:Value xsi:type=“xsd:string”>A1</psf:Value>
  </psf:Property>
</psf:Option>
<psf:Option name=“psk:ISOA0” constrained=“psk:None”>
  <psf:ScoredProperty name=“psk:MediaSizeWidth”>
    <psf:Value xsi:type=“xsd:integer”>841000</psf:Value>
  </psf:ScoredProperty>
  <psf:ScoredProperty name=“psk:MediaSizeHeight”>
    <psf:Value xsi:type=“xsd:integer”>1189000</psf:Value>
  </psf:ScoredProperty>
  <psf:Property name=“psk:DisplayName”>
    <psf:Value xsi:type=“xsd:string”>A0</psf:Value>
  </psf:Property>
</psf:Option>
```

FIG. 10C

1001

```
<psf:Option name="psk:JISB4" constrained="psk:None">
    <psf:ScoredProperty name="psk:MediaSizeWidth">
        <psf:Value xsi:type="xsd:integer">257000</psf:Value>
    </psf:ScoredProperty>
    <psf:ScoredProperty name="psk:MediaSizeHeight">
        <psf:Value xsi:type="xsd:integer">364000</psf:Value>
    </psf:ScoredProperty>
    <psf:Property name="psk:DisplayName">
        <psf:Value xsi:type="xsd:string">B4(JIS)</psf:Value>
    </psf:Property>
</psf:Option>
<pst:Option name="psk:JISB5" constrained="psk:None">
    <psf:ScoredProperty name="psk:MediaSizeWidth">
    <psf:Value xsi:type="xsd:integer">182000</psf:Value>
    </psf:ScoredProperty>
    <psf:ScoredProperty name="psk:MediaSizeHeight">
    <psf:Value xsi:type="xsd:integer">257000</psf:Value>
    <psf:ScoredProperty>
    </psf:Property name="psk:DisplayName">
    <psf:Value xsi:type="xsd:string">B5</psf:Value>
    </psf:Property>
</psf:Option>
<psf:Option name="psk:JISB3" constrained="psk:None">
    <psf:ScoredProperty name="psk:MediaSizeWidth">
    <psf:Value xsi:type="xsd:integer">364000</psf:Vlaue>
    </psf:ScoredProperty>
    <psf:ScoredProperty name="psk:MediaSizeHeight">
    <psf:Value xsi:type="xsd:integer">515000</psf:Value>
    </psf:ScoredProperty>
    <psf:Property name="psk:DisplayName">
    <psf:Value xsi:type="xsd:string">B3</psf:Value>
    </psf:Property>
</psf:Option>
<psf:Option name="psk:NorthAmericaLetter" constrained="psk:None">
    <psf:ScoredProperty name="psk:MediaSizeWidth">
        <psf:Value xsi:type="xsd:integer">215900</psf:Value>
    </psf:ScoredProperty>
    <psf:ScoredProperty name="psk:MediaSizeHeight">
        <psf:Value xsi:type="xsd:integer">279400</psf:Value>
    </psf:ScoredProperty>
    <psf:Property name="psk:DisplayName">
        <psf:Value xsi:type="xsd:string">Letter</psf:Value>
    </psf:Property>
</psf:Option>
..........
```

FIG. 10D

1002

```
</pst:Feature>

<psf:Feature name="ns0000:PageOutputMediaSize">
  <psf:Property name="psf:SelectionType">
    <psf:Value xsi:type="xsd:QName">psk:PickOne</psf:Value>
  </psf:Property>
• • <psf:Property name="psk:DisplayName">
• • • •   <psf:Value xsi:type="xsd:string">OUTPUT PAPER SIZE</psf:Value>
• • </psf:Property>
• • <psf:Option name="ns0000:MatchPageMediaSize" constrained="psk:None">
• • • •   <psf:Property name="psk:DisplayName">
• • • • • •   <psf:Value xsi:type="xsd:string">MATCH DOCUMENT SIZE</psf:Value>
• • • •   </psf:Property>
• • </psf:Option>
• • <psf:Option name="psk:ISOA3" constrained="psk:None">
• • • •   <psf:Property name="psk:DisplayName">
• • • •     <psf:Value xsi:type="xsd:string">A3</psf:Value>
• • • •   </psf:Property>
• • </psf:Option>
• • <psf:Option name="psk:ISOA4" constrained="psk:None">
• • • •   <psf:Property name="psk:DisplayName">
• • • •     <psf:Value xsi:type="xsd:string">A4</psf:Value>
• • • •   </psf:Property>
• • </psf:Option>
• • <psf:Option name="psk:ISOA5" constrained="psk:None">
• • • •   <psf:Property name="psk:DisplayName">
• • • •     <psf:Value xsi:type="xsd:string">A5</psf:Value>
• • • •   </psf:Property>
• • </psf:Option>
• • <psf:Option name="psk:JISB4" constrained="psk:None">
• • • •   <psf:Property name="psk:DisplayName">
• • • •     <psf:Value xsi:type="xsd:string">B4</psf:Value>
• • • •   </psf:Property>
• • </psf:Option>
• • <psf:Option name="psk:JISB5" constrained="psk:None">
• • • •   <psf:Property name="psk:DisplayName">
• • • •     <psf:Value xsi:type="xsd:string">B5</psf:Value>
• • • •   </psf:Property>
• • </psf:Option>
• • <psf:Option name="psk:NorthAmericaLetter" constrained="psk:None">
• • • •   <psf:Property name="psk:DisplayName">
• • • •     <psf:Value xsi:type="xsd:string">Letter</psf:Value>
• • • •   </psf:Property>
• • </psf:Option>
```

FIG. 10E

1003

```
  </psf:Feature>
        ..................
  <psf:Feature name="ns0000:SingleJobMixedPageMediaSizePrint">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">HANDLE SIZE-MIXED PRINTING IN SINGLE JOB</psf:Value>
    </psf:Property>
    <psf:Option name="ns0000:None" constrained="psk:None">
      <psf:Property name="psk:DisplayName">
        <psf:Value xsi:type="xsd:string">OFF</psf:Value>
      </psf:Property>
    </psf:Option>
    <psf:Option name="ns0000:Enable" constrained="psk:DeviceSettings">
      <psf:Property name="psk:DisplayName">
        <psf:Value xsi:type="xsd:string">ON</psf:Value>
      </psf:Property>
    </psf:Option>
  </psf:Feature>

        ....................

</PrintDeviceCapabilities>
```

INFORMATION PROCESSING APPARATUS AND METHOD OF CONTROLLING THE SAME, AND STORAGE MEDIUM

BACKGROUND OF THE INVENTION

Field of the Invention

The present invention relates to an information processing apparatus and a method of controlling the same, and a storage medium.

Description of the Related Art

Recently, general-purpose printer drivers that use industry-standard protocols such as Internet Printing Protocol (IPP) have been considered. As such general-purpose printer drivers, there are local printer drivers, which directly connect with printers, and cloud printer drivers, which transmit print data to cloud printing services.

General-purpose printer drivers can communicate with printers of a plurality of printer vendors different from each other. Therefore, by using a general-purpose printer driver, a user can transmit print data to a typical image forming apparatus, a cloud printing service, and the like without installing a vendor-specific printer driver.

Such general-purpose printer drivers handle print jobs to be printed on printers of various vendors, and so, functions and items that can be set as print settings are restricted. In addition, in general-purpose printer drivers, printer capability information that can be obtained is similarly restricted.

Thus, as in Japanese Patent Laid-Open No. 2021-124791, use of the identification information of a printer associated with a printer driver to expand a print queue associated with the printer driver is considered. This makes it possible to realize print job editing functions and print setting UIs specific to vendors.

Conventionally, a general-purpose printer driver, which is preinstalled on an operating systems (OS), obtains printer capability information of setting items predetermined by the OS for a printer that a user selected with the intention of using it for printing. The capability information includes paper sizes, and the general-purpose printer driver obtains paper sizes supported by the printer.

Incidentally, some applications for generating documents, drawings, and the like reference capability information of a printer associated with a print queue selected by the application when setting a paper size of data to be generated and display paper sizes present in the capability information of the printer in a selectable manner. There is a problem that when a general-purpose printer driver is used, with such applications even if the user wants to create document or drawing data in a size not present in the paper sizes of the capability information of the printer, the size that the user wants to use is not displayed and thus cannot be selected.

SUMMARY OF THE INVENTION

Embodiments of the present disclosure eliminate the above-mentioned issues with conventional technology.

A feature of embodiments of the present disclosure is to provide a technique in which even when an application that uses a general-purpose printer driver to reference capability information of a printer associated with a print queue that the application selected and obtain paper sizes is used, the application is able to create data in a paper size not supported by the printer.

According to embodiments of the present disclosure, there is provided an information processing apparatus comprising: one or more controllers including one or more processors and one or more memories, the one or more controllers configured to: update device capability information stored in advance in an operating system with capability information obtained from a printer; allow setting of print setting information based on the updated device capability information; obtain intermediate data generated by the operating system based on the print setting information; and generate print data based on the intermediate data, wherein in the update, the one or more controllers add an output paper size capability based on a paper size capability in the capability information obtained from the printer to the device capability information and, regarding the paper size capability, update the device capability information using predetermined information including a paper size not included in the capability information obtained from the printer.

According to embodiments of the present disclosure, there is provided a method of controlling an information processing apparatus, the method comprising: updating device capability information stored in advance in an operating system with capability information obtained from a printer; prompting a user to set print setting information based on the updated device capability information; obtaining intermediate data generated by the operating system based on the print setting information; and generating print data based on the intermediate data, wherein in the updating, an output paper size capability is added to the device capability information based on a paper size capability in the capability information obtained from the printer, and regarding the paper size capability, the device capability information is updated using predetermined information including a paper size not present in the capability information obtained from the printer.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 5 is a diagram illustrating an example of capability information of the printer in the first embodiment.

FIG. 6A is a diagram illustrating an example of device capability information in an initial state that is bundled with the OS in the first embodiment.

FIGS. 6B and 6C are diagrams illustrating an example of device capability information updated using capability information obtained from the cloud printing service in the first embodiment.

FIG. 7 is a diagram illustrating an example of an enhanced setup information file according to the first embodiment.

FIGS. 10A to 10E are diagrams illustrating an example of device capability information edited by the print setting expansion application in the first embodiment.

DESCRIPTION OF THE EMBODIMENTS

Figure 1:
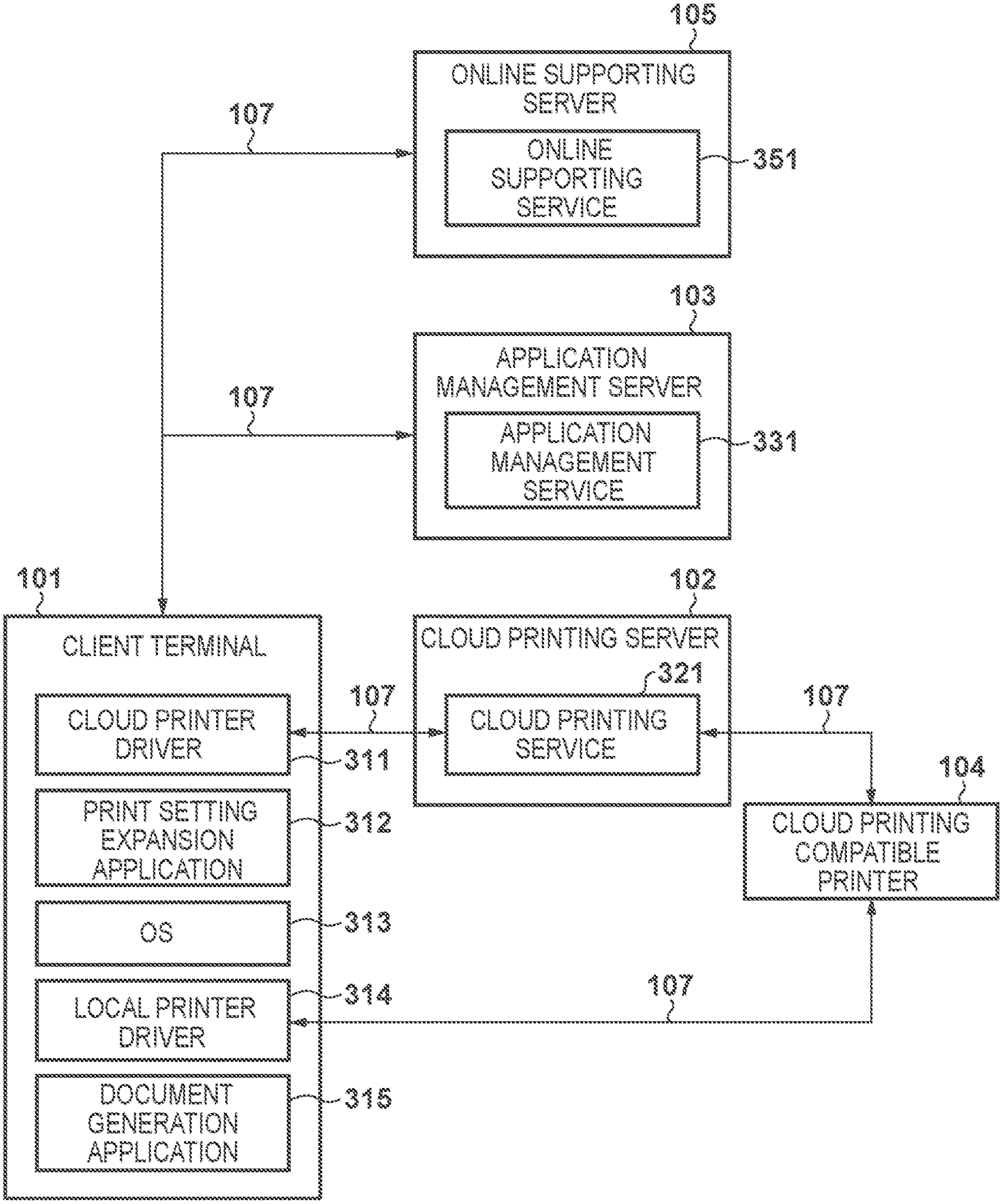
FIG. 1 is a diagram for describing a configuration of a printing system for executing cloud printing according to a first embodiment.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

First Embodiment

First, a first embodiment of the present invention will be described.

FIG. 1 is a diagram for describing a configuration of a printing system for executing cloud printing according to the first embodiment.

In the printing system, a client terminal 101, a cloud printing server 102, an application management server 103, a cloud printing compatible printer 104, and an online supporting server 105 are connected via a network 107. FIG. 1 illustrates one client terminal 101 and one cloud printing compatible printer 104, but there may be a plurality of client terminals 101 and cloud printing compatible printers 104.

The cloud printing server 102, the application management server 103, and the online supporting server 105 may each be a server system configured by a plurality of information processing apparatuses. By thus configuring a server system in which each server is constituted by a plurality of information processing apparatuses, it is possible to distribute the load among the plurality of information processing apparatuses.

The cloud printing server 102, the application management server 103, and the online supporting server 105 may be virtually configured in one physical information processing apparatus. Regarding the network 107, a WAN, such as the Internet, is assumed for connection to the cloud service, but a closed environment, such as a completely in-house LAN, may be employed.

The client terminal 101 is an information processing apparatus such as a PC, a tablet, or a smartphone, and is an information terminal that is directly operated by a user. Any application software can be executed on the client terminal 101. The client terminal 101 includes a cloud printer driver 311, an operating system (OS) 313, a local printer driver 314, a print setting expansion application (print setting expansion application program) 312 to be described later, and a document generation application 315 as basic software. The print setting expansion application 312 is received from the application management server 103 and installed as will be described later.

The cloud printing compatible printer 104 is a device that actually performs printing on a print medium, such as paper, and is an image forming apparatus that converts print data received through the network 107 into image data and prints the print data. The cloud printing compatible printer 104 can receive print data from the client terminal 101 via the cloud printing server 102. The cloud printing compatible printer 104 can receive print data directly from the client terminal 101 without using the cloud printing server 102. The cloud printing compatible printer 104 receives print data generated by the cloud printer driver 311 of the client terminal 101 through the cloud printing server 102. The cloud printing compatible printer 104 receives print data generated by the local printer driver 314 of the client terminal 101 without going through the cloud printing server 102.

The cloud printing server 102 includes a cloud printing service 321 and accepts print instructions and print data from the outside. The cloud printing server 102 transmits the received print data to a predetermined cloud printing compatible printer 104.

The application management server 103 holds and manages various applications. The application management server 103 receives the identification information of an application and a download request from the client terminal 101 and transmits an application identified based on the received identification information to the client terminal 101.

The online supporting server 105 is a server apparatus that provides an online supporting service 351. The online supporting service 351 is a server apparatus for providing the client terminal 101 with an enhanced setup information file describing information for expanding the functions of the client terminal 101.

Next, a hardware configuration of the client terminal 101, the servers 102, 103, 105, and the cloud printing compatible printer 104 included in the printing system according to the first embodiment will be described with reference to FIGS. 2A to 2E.

Figure 2A:
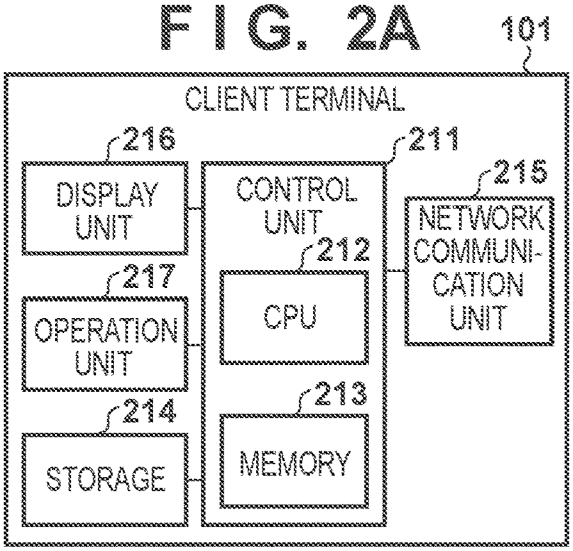
FIGS. 2A to 2E are diagrams for explaining a hardware configuration of a client terminal, a server, and a cloud printing compatible printer included in the printing system according to the first embodiment.

FIG. 2A is a block diagram for explaining a hardware configuration of the client terminal 101 according to the first embodiment.

The client terminal 101 includes a display unit 216, an operation unit 217, a storage 214, a control unit 211, and a network communication unit 215. The storage 214 corresponds to a non-volatile storage apparatus, such as a hard disk or an SSD, and can store and rewrite digital data. The control unit 211 includes a CPU 212 and a memory 213 and controls the overall operation of the client terminal 101. The CPU 212 deploys a program stored in the storage 214 in the memory 213 and executes the program. The memory 213 is a main storage memory of the CPU 212 and is used as a work area as well as a temporary storage region for deploying various programs. The network communication unit 215 communicates with the external network 107 and inputs and outputs digital data to and from an external server, a client terminal, and the like via the network 107. The display unit 216 is, for example, a liquid crystal display, and displays visual information to the user. The operation unit 217 accepts inputs from the user through a keyboard, a pointing device, and the like. An apparatus, such as a touch panel, provided with functions of both the display unit 216 and the operation unit 217 may be used as the operation unit 217.

Figure 2B:
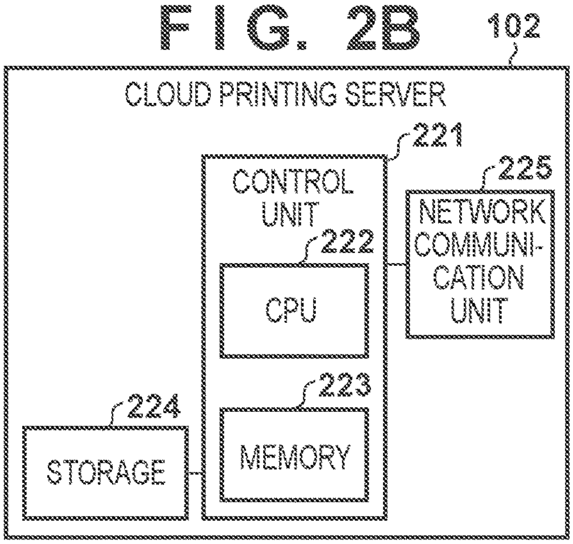

FIG. 2B is a block diagram for explaining a hardware configuration of the cloud printing server 102 according to the first embodiment.

The cloud printing server 102 includes a storage 224, a control unit 221, and a network communication unit 225. The control unit 221 includes a CPU 222 and a memory 223. The descriptions of the storage 224, the control unit 221, and the network communication unit 225 are basically equivalent to that of corresponding portions of the client terminal 101 and thus will be omitted. Although the cloud printing server 102 is described as being configured by a single information processing apparatus having the hardware configuration illustrated in FIG. 2B, the cloud printing server 102 may be constituted by a plurality of information processing apparatuses.

Figure 2C:
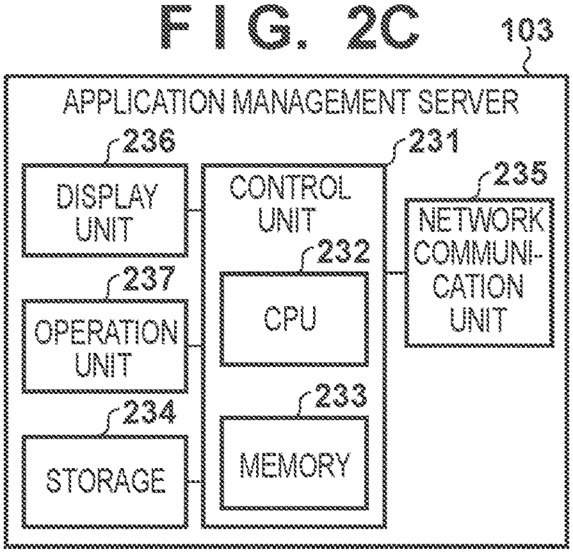

FIG. 2C is a block diagram for explaining a hardware configuration of the application management server 103 according to the first embodiment.

The application management server 103 includes a display unit 236, an operation unit 237, a storage 234, a control unit 231, and a network communication unit 235. The control unit 231 includes a CPU 232 and a memory 233. The description of the display unit 236, the operation unit 237, the storage 234, the control unit 231, and the network communication unit 235 are basically equivalent to that of corresponding portions of the client terminal 101 and thus will be omitted. Although the application management server 103 is described as being constituted by a single information processing apparatus having the hardware configuration illustrated in FIG. 2C, the application management server 103 may be configured by a plurality of information processing apparatuses.

Figure 2D:
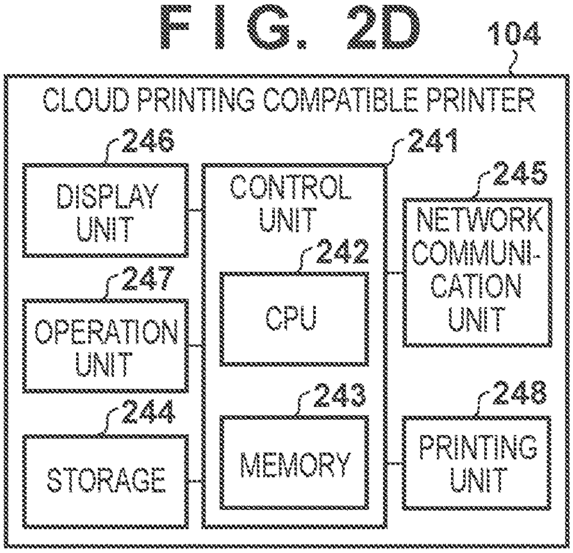

FIG. 2D is a block diagram for explaining a hardware configuration of the cloud printing compatible printer 104 according to the first embodiment.

The cloud printing compatible printer 104 includes a display unit 246, an operation unit 247, a storage 244, a control unit 241, a network communication unit 245, and a printing unit 248. The display unit 246 is a touch panel, an LED, and the like provided in the cloud printing compatible printer 104 and displays information to the user. The operation unit 247 accepts inputs from the user and may include physical keys, such as a numeric keypad, in addition to the touch panel. The control unit 241 includes a CPU 242 and a memory 243. The storage 244 and the control unit 241 are basically equivalent to corresponding parts of the client terminal 101, and thus, description thereof will be omitted. The network communication unit 245 communicates via the external network 107. The network communication unit 245 mainly serves to receive print data and transmit the state of the cloud printing compatible printer 104, such as an error, to an external server or the like.

The printing unit 248 performs print processing by performing a series of operations of feeding, printing, and discharging paper (sheets) provided in a cassette or a tray. The printing method here is an electrophotographic method, an ink jet method, or the like and is not particularly limited. A double-sided unit used during discharging and a finishing apparatus for stapling, punching processing, and the like are also included in the printing unit 248.

Although in the first embodiment a single-function printer that performs only a printing function is described as an example of the cloud printing compatible printer 104, a multi-function printer (multi-function peripheral) that also includes a scanner function and a fax function may be used.

Figure 2E:
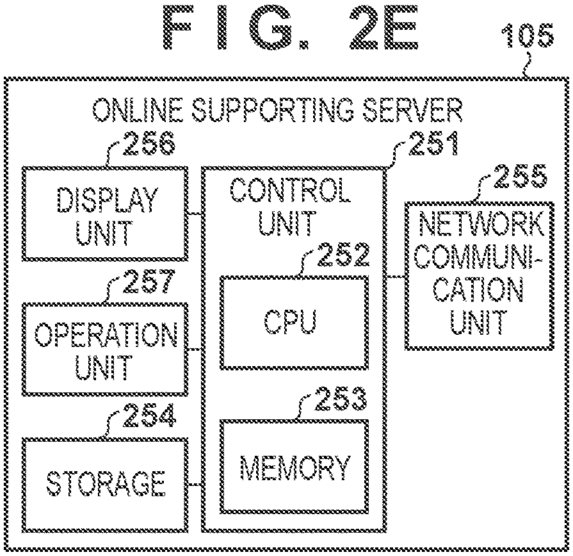

FIG. 2E is a block diagram for explaining a hardware configuration of the online supporting server 105 according to the first embodiment. In the first embodiment, the online supporting server 105 is described as being constituted by one information processing apparatus but may be constituted by a plurality of information processing apparatuses.

The online supporting server 105 includes a display unit 256, an operation unit 257, a storage 254, a control unit 251, and a network communication unit 255. The functions of the display unit 256 and the operation unit 257 are similar to those of the display unit 216 and the operation unit 217 of the client terminal 101, and thus, description thereof will be omitted. The storage 254 is a memory device, such as an HDD or an SSD. The storage 254 stores an enhanced setup information file, which is a file describing information for expanding the functions provided by the client terminal 101.

The control unit 251 includes a CPU 252 and a memory 253. The CPU 252 controls the entire online supporting server 105. The memory 253 is used for processing performed by the CPU 252. The network communication unit 255 is an interface for the online supporting server 105 to communicate with the client terminal 101. Upon receiving a request for obtaining a file stored in the storage 254 from the client terminal 101 through the network communication unit 255, the online supporting server 105 transmits a corresponding file to the client terminal 101.

Next, an example of a procedure by a user and a sequence between respective pieces of software and the printing service in the first embodiment will be described with reference to FIG. 3.

Figure 3:
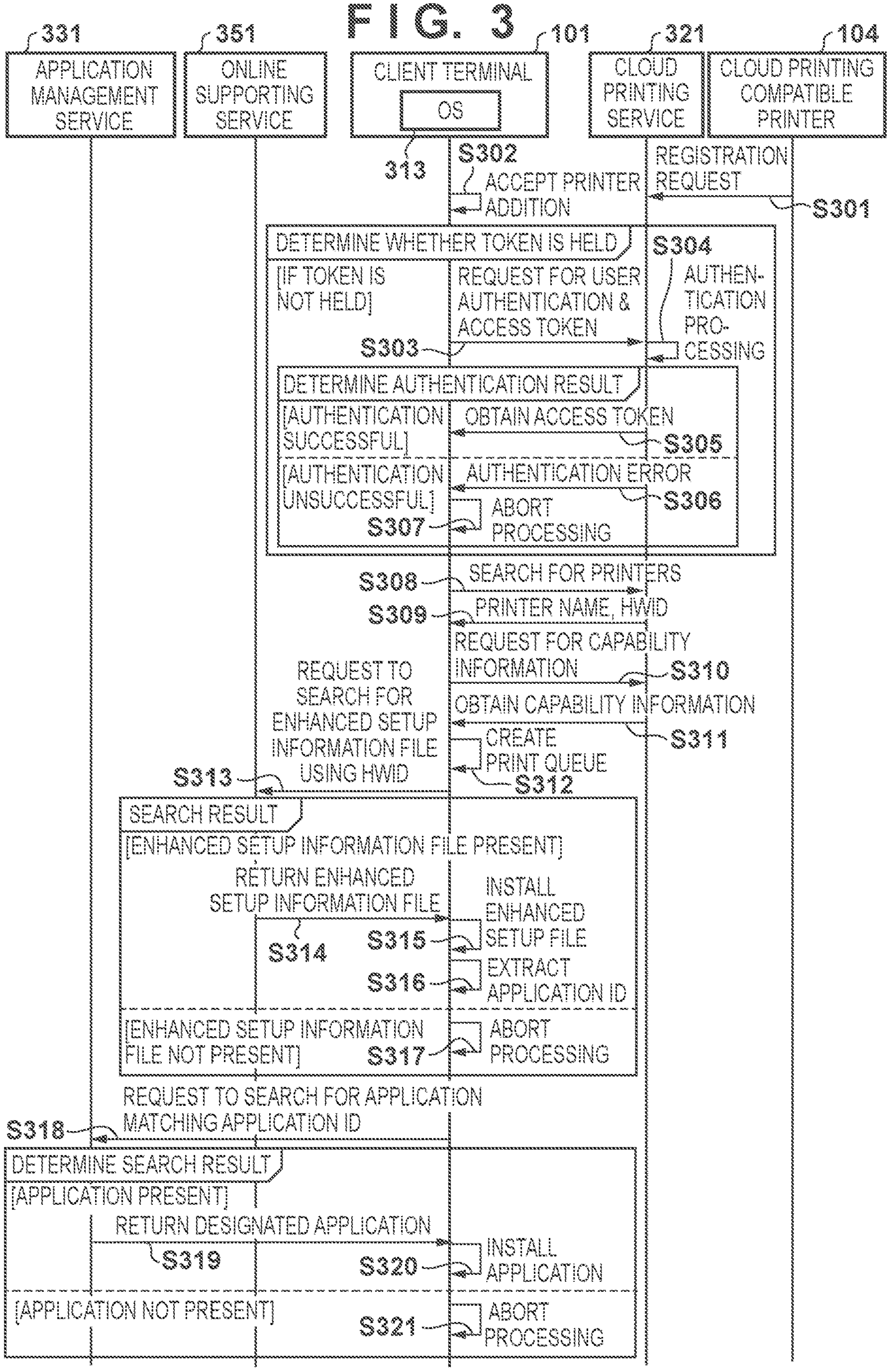
FIG. 3 is a diagram for explaining an example of a sequence in which the client terminal installs a print setting expansion application for the cloud printing compatible printer from an online supporting server in the printing system according to the first embodiment.

FIG. 3 is a diagram for explaining an example of a sequence in which the client terminal 101 installs the print setting expansion application 312 for the cloud printing compatible printer 104 from the online supporting server 105 in the printing system according to the first embodiment.

First, the cloud printing compatible printer 104 accepts a printer registration operation for registering the cloud printing compatible printer 104 in the cloud printing service 321 from the user. Thus, in step S301, the cloud printing compatible printer 104 transmits a printer registration request to the cloud printing service 321 along with the device identification information of the printer 104. Here, the device identification information transmitted to the cloud printing service 321 is, for example, a hardware ID (HWID) allocated for a respective model of printer. The device identification information may be any piece of information by which the model of printer can be identified.

Upon receiving the registration request, the cloud printing service 321 transmits a Uniform Resource Locator (URL) of the cloud printing service 321 for printer registration to the cloud printing compatible printer 104. When the user accesses the URL from the cloud printing compatible printer 104 or an information processing apparatus, an input screen for inputting a user ID and a password is displayed on the display unit of the terminal that accessed the URL. Then, the user inputs a user ID and a password for utilizing the cloud printing service 321 and logs in to the cloud printing service 321. When the user thus logs in successfully, the cloud printing service 321 transmits a request for obtaining information necessary for registering a printer to the cloud printing compatible printer 104. Accordingly, in response to the request, the cloud printing compatible printer 104 transmits printer information to the cloud printing service 321.

Next, upon receiving the printer registration request, the cloud printing service 321 registers the information of the cloud printing compatible printer 104 and generates a print queue for the cloud printing compatible printer 104. At this time, the cloud printing service 321 obtains the capability information of the cloud printing compatible printer 104 and associates the capability information with the generated print queue. Here, the capability information is information representing the functions provided in the printer 104 and refers to information necessary for the user to perform settings as print setting at the time of printing using the printer 104, such as double-sided printing capability information, color printing capability information, and stapling capability information.

FIG. 5 is a diagram illustrating an example of the capability information of the printer in the first embodiment. The capability information of the printer may include items and attribute values other than those illustrated in FIG. 5.

Capability information is constituted by item names and attribute values. An item name corresponds to a setting item of print settings. An attribute value corresponds to a setting value, option, or value range that can be set for a respective setting item. In addition to item names and attribute values defined as an industry-standard specification by IPP, the cloud printing compatible printer 104 stores item names and attribute values that are uniquely defined by the printer vendor. Item names defined as an industry-standard specification by IPP include, for example, "paper size", "paper type", and "color mode".

Meanwhile, among the item names described in FIG. 5, "handle size-mixed printing in single job" 501 according to the first embodiment and associated attribute values are item names and attribute values that are uniquely defined by the printer vendor. In the first embodiment, assume that size-mixed printing refers to printing a document in which a different paper size is designated for each page by the document generation application 315 according to the designated paper size. "Handle size-mixed printing in single job" 501 is an item for setting whether to handle processing for size-mixed printing in a single job. In the first embodiment, when the cloud printing compatible printer 104 has this item, assume that the printer has the capability of interpreting a paper size of each page from print data and performing printing in a single job according to the setting. In addition, when the cloud printing compatible printer 104 does not have this capability or this setting is OFF at the time of printing, assume that the processing for size-mixed printing will be executed by dividing it into a plurality of jobs. Details of the processing will be described later.

In addition to "handle size-mixed printing in single job" 501, "store job in printer" 502, "job name abbreviation" 503, "staple-less binding" of an item "staple", and associated attribute values are item names and attribute values uniquely defined by the printer vendor.

In the first embodiment, the cloud printing compatible printer 104 transmits capability information to the cloud printing service 321 according to IPP as a communication protocol. The cloud printing compatible printer 104 registers the capability information using a command prepared for the cloud printing compatible printer 104 to register the capability information in the cloud printing service 321. The cloud printing compatible printer 104 notifies the cloud printing service 321 of the item names illustrated in FIG. 5, attribute values and a default value corresponding to each item name. Regarding the capability information to be notified here, it does not matter whether the respective items and attribute values are defined in IPP. For example, the cloud printing service 321 is notified of item names and attribute values for "handle size-mixed printing in single job", "store job in printer", "job name abbreviation" and "staple-less binding" illustrated in FIG. 5. Also, "saddle fold", which is one of the attribute values of an item "folding setting" and is an attribute value unique to the printer vendor, is registered in the cloud printing service 321 as one of the attribute values of the "folding setting".

Next, installation of the print setting expansion application 312 performed when the user performs on the client terminal 101 a setup operation for performing printing on the cloud printing compatible printer 104 will be described. When registering the cloud printing compatible printer 104 to the client terminal 101, a standard printing function, which is one of the functions that the OS 313 of the client terminal 101 has, is used.

In step S302, the OS 313 of the client terminal 101 accepts an add printer operation, which is an operation for setting up the cloud printing compatible printer 104 by the user. Next, the operation for setting up the cloud printing compatible printer 104 will be described.

Figure 4:
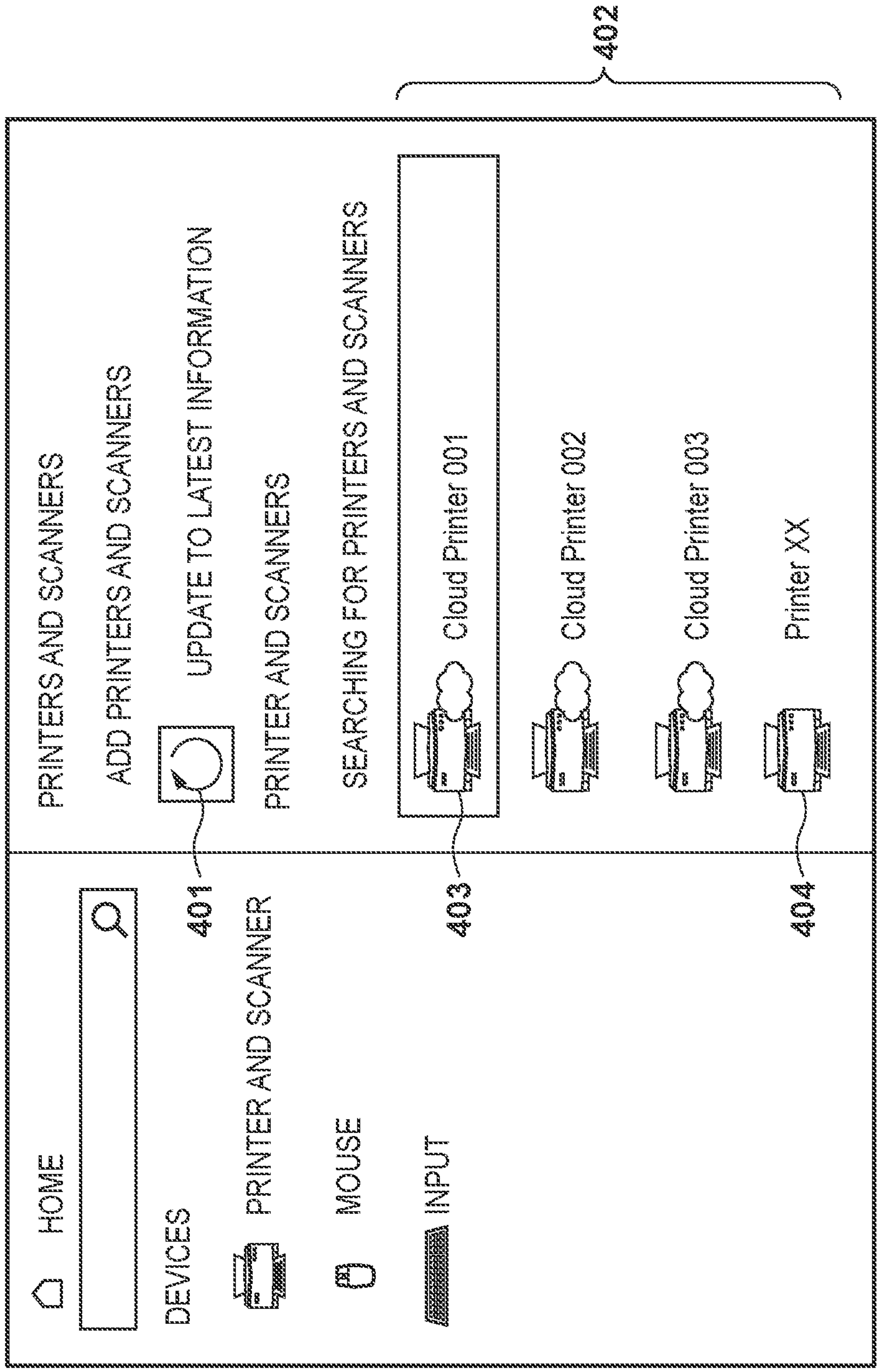
FIG. 4 depicts a view illustrating an example of a screen related to printers registered in the client terminal that is displayed by an OS of the client terminal according to the first embodiment.

FIG. 4 depicts a view illustrating an example of a screen related to printers registered in the client terminal 101 that is displayed by the OS 313 of the client terminal 101 according to the first embodiment.

In the screen, a printer search instruction is inputted to the OS 313 by the user selecting an object 401. Upon accepting the printer search instruction, the OS 313 determines whether it holds a token for the cloud printing service 321.

Here, if the OS 313 does not hold a token, the OS 313 displays a screen (not illustrated) for inputting user information (login name and password). In step S303, the OS 313 of the client terminal 101 transmits the user information inputted through the screen to the cloud printing service 321 and makes a request for user authentication and an access token.

Thus, in step S304, the cloud printing service 321 performs authentication processing using the user information received from the client terminal 101. Upon completing the authentication processing, the cloud printing service 321 notifies the client terminal 101 of the result of the authentication processing. Here, if user authentication is successful, the OS 313 of the client terminal 101 obtains an access token from the cloud printing service 321 in step S305. Meanwhile, if user authentication fails in step S304, the cloud printing service 321 notifies the OS 313 of the client terminal 101 of an authentication error in step S306. Accordingly, in step S307, the OS 313 of the client terminal 101 aborts the processing based on the received authentication error information. If the access token is thus not obtained, the OS 313 of the client terminal 101 ends the processing described in FIG. 3.

If the OS 313 holds the access token or obtains the access token in step S305, the OS 313 of the client terminal 101 searches for printers registered in the cloud printing service 321 and printers connected to the network 107 in step S308. At this time, the OS 313 of the client terminal 101 searches for printers by transmitting a request for obtaining information of printers registered in the cloud printing service 321. Specifically, the OS 313 of the client terminal 101 transmits a request for obtaining information of printers with the access token attached to the cloud printing service 321.

As a result, in step S309, the cloud printing service 321 transmits information of a printer that the user identified by the access token attached to the obtainment request is allowed to use to the client terminal 101. Here, the printer information transmitted to the client terminal 101 includes the printer name assigned to the printer registered in the cloud printing service 321 and HWID of the printer.

In this way, the OS 313 of the client terminal 101 obtains a list of printers transmitted by the cloud printing service 321 and the device identification information of each printer. In parallel with the processing of steps S308 and S309, the OS 313 of the client terminal 101 searches for printers connected to the same network as the client terminal 101. This is a search for devices by mDNS, Bonjour, and the like.

The OS 313 displays the list of printers on the client terminal 101 based on the information of printers obtained from the cloud printing service 321 and the information of printers detected in the search in the network 107. In a region 402 of FIG. 4, the information of printers received from the cloud printing service 321 is displayed in a list. In the information displayed in the region 402, "Cloud Printer 001/002/003" is information of printers registered in the cloud printing service 321. Meanwhile, "Printer XX" to which an icon 404 has been attached indicates a printer that the client terminal 101 detected by searching the network 107. In this way, the information of printers obtained from the cloud printing service 321 and the information of the printer detected by searching the network 107 are displayed in a list. In this list, the information of printers received from the cloud printing service 321 are displayed with an icon 403, and the information of the printer detected by searching the network 107 is displayed with the icon 404. In this way, the information of printers received from the cloud printing service 321 and the information of the printer detected by searching the network 107 can be displayed so as to be distinguished from each other. The client terminal 101 may display only the information of printers registered in the cloud printing service 321.

The user then selects the information of a printer that corresponds to a printer to be registered in the client terminal 101 from the information of printers displayed in the region 402.

Thus, in step S310, the OS 313 of the client terminal 101 queries the cloud printing service 321 for the printer capability information corresponding to the selected printer information. Here, which setting items the OS 313 of the client terminal 101 queries the capability information for is determined by the specifications of the OS 313 and is set in the OS 313. The OS 313 of the client terminal 101 designates setting items stored in advance and queries the capability information therefor. The setting items stored in advance in the OS 313 are setting items defined as a standard specification by IPP, for example, items such as "paper size", "paper type", and "color mode".

Thus, in step S311, the cloud printing service 321 responds to the OS 313 of the client terminal 101 with the capability information of the cloud printing compatible printer 104.

In the first embodiment, description is given assuming that the information registered in the cloud printing service 321 in the registration request of step S301 is transmitted to the client terminal 101 in step S311. However, the capability information registered in the cloud printing service 321 may be transmitted to the client terminal 101 at a timing other than the above. For example, the capability information registered in the cloud printing service 321 may be transmitted to the client terminal 101 in response to a change in the capability information of the cloud printing compatible printer 104. In addition, a configuration may be taken such that when the user instructs update of capability information on a user interface provided by the cloud printing service 321, the updated capability information is transmitted to the client terminal 101 according to the instruction. Further, a configuration may be taken such that at the timing of step S310, the cloud printing service 321 obtains the capability information from the cloud printing compatible printer 104 and notifies the client terminal 101 of the obtained capability information.

In this way, in step S311, the cloud printing service 321 returns attribute values and default values for setting items designated by the client terminal 101. Here, attribute values to be returned are all the attribute values registered in the cloud printing service 321 regardless of whether they are attribute values defined as a standard. The default values are values that are initially set when the client terminal 101 displays a print setting screen. When a response for an attribute queried from the OS 313 of the client terminal 101 is not stored, the cloud printing service 321 does not respond to the query from the OS 313. The OS 313 then starts installation of the cloud printer driver 311 based on the device identification information and the printer name of the printer selected by the user.

In step S312, the OS 313 generates a print queue of the cloud printer driver 311 that has basic device capability information bundled with the OS 313. The device capability information refers to definition information necessary for generating print setting capability information of the printer driver, such as those described in XML (e.g., PrintDeviceCapabilites).

FIG. 6A is a diagram illustrating an example of device capability information in an initial state that is bundled with the OS 313.

For example, as indicated by reference numeral 601, "Feature" indicates that "psk: PageMediaSize" representing paper sizes is a setting item. "Option" indicates options corresponding to "psk: PageMediaSize". In the initial values of the device capability information, there are only two options, "A4" (ISOA4) and "LETTER" (NorthAmericaLetter), for paper size as in FIG. 6A. This information is stored in association with the print queue when the print queue is generated and is managed by the OS 313. The device capability information in the initial state is device capability information that is fixed regardless of the information of the connected printer.

In step S312, the OS 313 updates the device capability information constituting the cloud printer driver 311 using the capability information obtained from the cloud printing service 321. FIGS. 6B and 6C are diagrams illustrating an example of device capability information updated using capability information obtained from the cloud printing service 321.

For example, as indicated by reference numeral 602, "Option" other than "A4" and "LETTER" are added as paper sizes that can be printed by the cloud printing compatible printer 104 to the "psk: PageMediaSize" representing paper sizes. Specifically, they are "A3" (ISOA3), "A5" (ISOA5), "B4" (JISB4), and the like.

In this way, the client terminal 101 first registers the device capability information bundled with the OS 313 and the cloud printer driver 311 in association in a print queue. Then, the device capability information associated with the print queue is updated using the capability information obtained from the cloud printing service 321. At this time, the OS 313 updates the device capability information using only the attribute values defined in the industry-standard specification in the capability information obtained from the cloud printing service 321. Therefore, for example, even if a vendor-specific attribute value is obtained as paper type in obtainment of capability information, the vendor-specific attribute value is not added to the device capability information if the vendor-specific attribute value is not included in the industry-standard specification. In this way, it becomes possible to set print setting values defined in the industry-standard specification, which cannot be set with the device capability information bundled with the OS 313.

Thus, the installation of the cloud printer driver 311 is completed. By performing the processing thus far, the client terminal 101 can transmit print data to a print queue for the cloud printing compatible printer 104 generated in the cloud printing service 321.

The OS 313 then begins processing for installing an application associated with the registered printer and for extending the cloud printing driver.

First, the OS 313 performs processing for appending additional identification information to the device identification information. This is processing necessary when obtaining enhanced setup information file 700 (FIG. 7) to be described later from the online supporting server 105, and the processing need only generate a character string different from typical device identification information. In the case of the first embodiment, in order to distinguish the application from applications of other devices, the OS 313 appends additional identification information "PrinterApp_" indicating that the application corresponds to the printer in the device identification information. "PrinterApp_" is only one example and may be another character string, a number, or a symbol. As a result of the above processing, for example, if the device identification information of the cloud printing compatible printer 104 is "device001," the device identification information to which additional identification information has been appended will be "PrinterApp_device001".

Next, in step S313, the OS 313 transmits a search request for the enhanced setup information file 700 containing the device identification information to which target additional information has been appended to the online supporting service 351. Thus, the "PrinterApp_device001" for which additional identification information has been added is notified to the online supporting service 351. The online supporting service 351 stores the enhanced setup information file 700 illustrated in FIG. 7.

FIG. 7 is a diagram illustrating an example of the enhanced setup information file 700 according to the first embodiment.

The enhanced setup information file is a file created by the vendor of the cloud printing compatible printer 104 and registered to the online supporting service 351.

The enhanced setup information file 700 describes an application identifier for identifying a print setting expansion application to be used for settings for print data to be transmitting to the cloud printing compatible printer 104. In the enhanced setup information file 700 illustrated in FIG. 7, an item "PackageFamilyName" 701 is the identification information of the print setting expansion application. Meanwhile, "PrinterHardwareId" 702 describes a character string for which the additional identification information has been appended to the identification information of the cloud printing compatible printer 104.

In addition to the enhanced setup information file in which the identification information of the print setting expansion application is described, the online supporting service 351 stores enhanced setup information in which the identification information of a printer driver is described. In the enhanced setup information file describing the identifier of a printer driver, the identifier of the printer driver is described in "PackageFamilyName". In addition, the device identification information in which additional identification information is not written is described in "PrinterHardwareId" of the enhanced setup information file.

In this way, the online supporting service 351 stores both the enhanced setup information file describing the identifier of the printer driver and the enhanced setup information file describing the identifier of the print setting application. Therefore, the OS 313 appends additional identification information to the device identification information in order to obtain the necessary enhanced setup information file as appropriate.

Upon receiving the search request in step S313, the online supporting service 351 identifies the device identification information to which the additional identification information designated in the request is appended and the enhanced setup information file in which "PackageFamilyName" in the file matches.

As a result of the search, if the online supporting service 351 holds the enhanced setup information file 700 containing the target device identification information, in step S314 the enhanced setup information file 700 is returned to the OS 313. At this time, the content of the enhanced setup information file 700 is written in a registry of the OS 313. Next, in step S315, the OS 313 installs the enhanced setup information written in the enhanced setup information file 700 obtained from the online supporting service 351 in association with the print queue generated in step S312. Next, in step S316, the OS 313 extracts an application ID from the installed enhanced setup information. The application ID is an identifier specified in "PackageFamilyName" in the enhanced setup information file 700. The above describes the processing when the online supporting service 351 stores an enhanced setup file corresponding to the cloud printing compatible printer 104.

Meanwhile, there are cases where as a result of the search the enhanced setup information file 700 containing the target device identification information is not detected in the online supporting service 351. At this time, the OS 313 completes the installation of the cloud printing driver and aborts the application installation processing in step S317. The OS 313 executes the abort processing of step S317 when an enhanced setup file is not received within a predetermined time from the search request of step S313 or when an error notification is received from the online supporting service 351.

Next, processing for when an enhanced setup file is obtained by the OS 313 and an application ID is extracted in step S316 is described in step S318 onward.

In step S318, the OS 313 requests the application management service 331 to search for an application matching the extracted application ID. The application management service 331 stores an application that operates on the client terminal 101 and an application ID that is an identifier of the application in associates. The application and the application ID are registered in the application management service 331 by the vendor providing the cloud printing compatible printer 104.

If the application management service 331 holds a print setting expansion application matching the requested application ID, in step S319 the application management service 331 returns the print setting expansion application 312 to the client terminal 101. Here, the returned print setting expansion application 312 is an application to which the same ID as the transmitted application ID is assigned. Thus, in step S320, the OS 313 installs the print setting expansion application 312 obtained in step S319 in association with the client-side print queue. At this time, the OS 313 stores the application ID in the registry as print queue information. The print setting expansion application 312 performs setting in the OS 313 so that the print queue associated with the application notifies the OS 313 of an event at the timing set in the print setting screen. The print setting expansion application 312 installed in this way is started after the power of the client terminal 101 is turned on and the OS 313 is started and operates as a background task after it is started.

Meanwhile, if the application management service 331 does not hold a print setting expansion application matching the requested application ID, in step S321 the OS 313 aborts the application installation processing. In this case, the cloud printer driver 311 is installed in association with the generated print queue, and the processing is terminated without the print setting expansion application 312 being associated with the print queue.

In the above-described description, a predetermined character string is added to the device identification information of the cloud printing compatible printer 104 to search for the enhanced setup file. However, a configuration may be taken so as to perform a search without adding a predetermined character string if a file for installing a printer driver can be distinguished.

Next, an example of a procedure by a user and a sequence between respective pieces of software and the printing service according to the first embodiment will be described with reference to FIG. 8.

Figure 8:
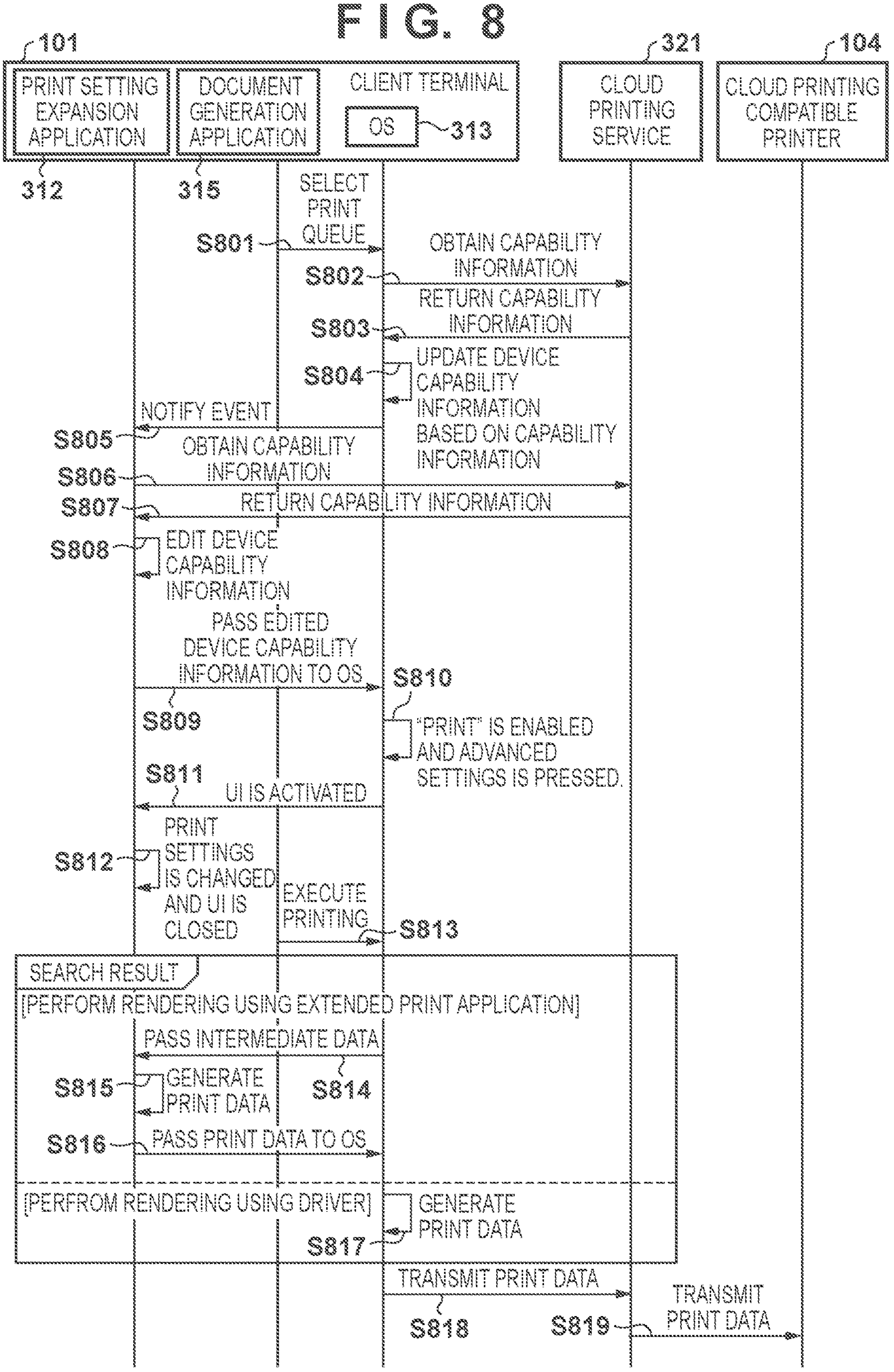
FIG. 8 is a sequence diagram for explaining processing from performing print settings for the cloud printing compatible printer up to transmission of print data in the print setting expansion application according to the first embodiment.

FIG. 8 is a diagram for describing an example of a sequence for explaining processing from performing print settings for the cloud printing compatible printer 104 in the print setting expansion application 312 up to transmission of print data according to the first embodiment.

The document generation application 315 is an application such as an application for creating document data, an application for creating drawing data, or an application for displaying photographs and image data. The document generation application 315 displays a print setting screen (FIG. 9) for selecting a print queue as an initial screen for print settings. In the first embodiment, the document generation application 315 displays the initial screen for print settings, but the OS 313 may display a similar screen.

Figure 9:
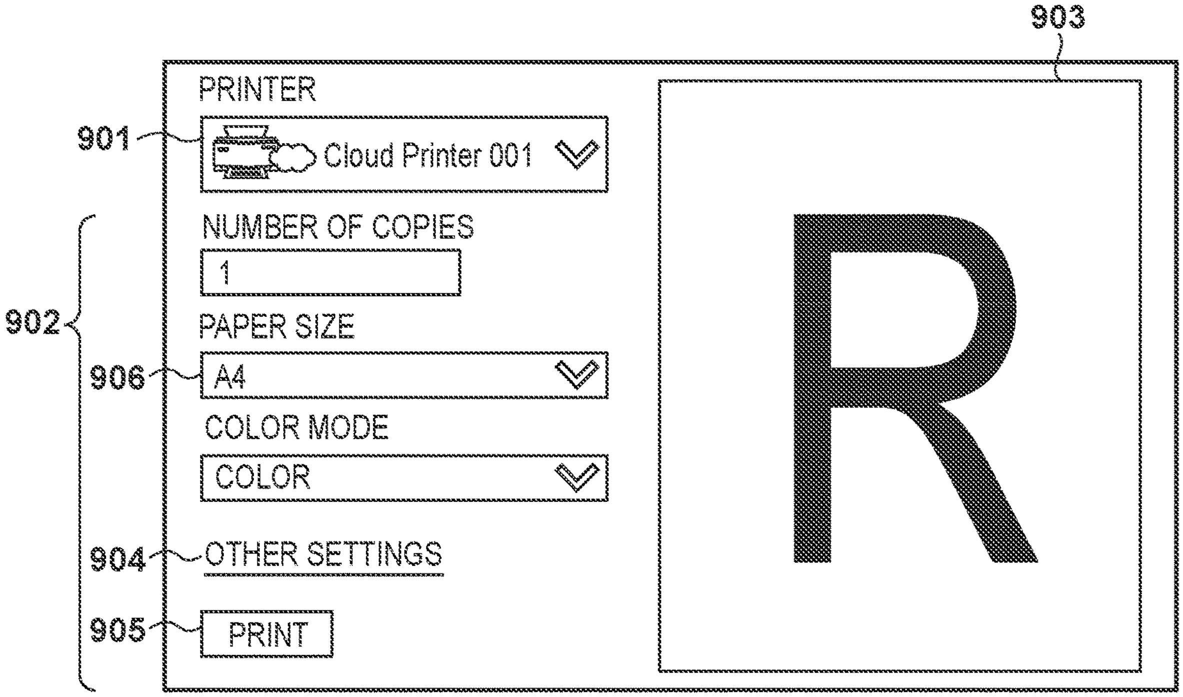
FIG. 9 depicts a view illustrating an example of a print setting screen to be displayed by a document generation application according to the first embodiment.

FIG. 9 depicts a view illustrating an example of a print setting screen to be displayed by the document generation application 315 according to the first embodiment.

The initial screen for print settings displays an object 901 for selecting a print queue, an object group 902 for performing various print settings including an object 906 for setting a paper size, and a print preview image 903. The description of each object included in the object group 902 will be described later.

First, in step S801, the OS 313 selects a print queue associated with a printer set as the default printer. In the first embodiment, the cloud printing compatible printer 104 is selected as the default printer. The processing of step S801 onward is also executed when the user operates the object 901 to change the printer to be used.

Next, in step S802, the OS 313 queries the queue on the cloud that corresponds to the cloud printing compatible printer 104 of the cloud printing service 321 for the capability information of the cloud printing compatible printer 104. The capability information for which setting item is queried is predetermined by the specifications of the OS 313. Therefore, the capability information obtained at this timing is similar to that obtained in step S311 of FIG. 3 described above. The query is made to the cloud printing compatible printer 104 using a standard protocol command defined by IPP, such as Get-printer-Attributes. If Get-printer-Attributes is used, the capability information determined by the OS 313 is queried in a list format.

Accordingly, in step S803, the cloud printing service 321 returns the capability information of the cloud printing compatible printer 104 from the list of capability information transmitted using Get-printer-Attributes to the OS 313. For example, assume that a paper size attribute is designated using Get-printer-Attributes (IPP). If the cloud printing service 321 holds a paper size attribute, a value (A4, B5, Letter, etc.) associated with that attribute is returned. If an attribute designated in Get-printer-Attributes is not present in the queue of the cloud printing compatible printer 104 of the cloud printing service 321, the cloud printing Service 321 does not return an associated value. The capability information obtained in step S803 is capability information queried regardless of the type or capability of the printer to which the OS 313 is connected.

Next, in step S804, the OS 313 uses the capability information obtained from the cloud printing service 321 to update the device capability information. At this time, the OS 313 adds the capability information obtained in step S803 of FIG. 8 to the device capability information generated in step S312 of FIG. 3. If there is an update in the device capability information, the device capability information managed by the client terminal 101 can be updated by performing step S803. In the update of the device capability information in step S804, the device capability information is updated only for the attribute values defined by the industry-standard specification.

Next, the processing proceeds to step S805, and the OS 313 notifies the print setting expansion application 312 of an event and an Application Programming Interface (API) used for editing device capability information. The notification timing of this event is registered when the print setting expansion application 312 is installed on the OS 313 of the client terminal 101.

Upon receiving the event, in step S806 the print setting expansion application 312 makes a request for obtaining capability information to the cloud printing service 321. The obtainment of capability information performed here is the obtainment of capability information for writing setting items and attribute values uniquely defined by the printer vendor in the device capability information. At this time, upon receiving the event in step S805 from the OS 313, the print setting expansion application 312 queries the capability information of the cloud printing compatible printer 104 through the cloud printing service 321 in step S806. At this time, the print setting expansion application 312 queries the cloud printing service 321 for capability information for setting items unique to the printer vendor and setting items including attribute values unique to the printer vendor. Similarly to step S802 of FIG. 8, this query is performed using Get-printer-Attributes, and capability information is obtained by designating the item name of a setting item to be queried as an item name. In the first embodiment, it is described that in step S806, capability information is obtained for setting items uniquely defined by the printer vendor and setting items including attribute values uniquely defined by the printer vendor. However, capability information may be obtained for setting items that have already been obtained in the obtainment of capability information by the OS 313.

Upon a query for unique capability information from the print setting expansion application 312, in step S807 the cloud printing service 321 returns the capability information of the cloud printing compatible printer 104 to the print setting expansion application 312. The response method here is similar to that of the previously-described step S803 of FIG. 8. In the first embodiment, in step S807 the cloud printing service 321 returns the capability information of the cloud printing compatible printer 104 stored in the cloud printing service 321. In addition, upon receiving a request of step S806, the cloud printing service 321 may re-obtain the capability information from the cloud printing compatible printer 104 and return the capability information to the client terminal 101. In the first embodiment, with steps S806 and S807 the print setting expansion application 312 can obtain the capability information of "handle size-mixed printing in single job", which is a setting item unique to the printer vendor.

Next, in step S808, upon obtaining the capability information of the cloud printing compatible printer 104, the print setting expansion application 312 edits the device capability information managed by the OS 313 through a configuration information object. The configuration information object is a set of data necessary for editing device capability information. The print setting expansion application 312 cannot directly edit the device capability information held in the OS 313. Therefore, the configuration information object is used to change the device capability information held in the OS 313.

For example, in step S807 of FIG. 8, when capability information such as "handle size-mixed printing in single job" is obtained, the capability information is converted into device capability information and is added to the configuration information object to edit the device capability information. At this time, the print setting expansion application 312 rewrites the content of "psk: PageMediaSize" representing paper sizes of the device capability information into information including paper sizes not supported by the cloud printing compatible printer 104. Regardless of the information obtained in step S807, the rewriting performs rewriting into information predetermined by the print setting expansion application 312. In addition, the print setting expansion application 312 adds "ns0000: PageOutputMediaSize" as a setting item unique to the printer vendor. Then, paper size included in the "psk: PageMediaSize" obtained in step S807 are added as attribute values thereof. In this way, by performing the processing up to step S808, setting items and attribute values unique to the printer vendor are stored in the device capability information in addition to the capability information related to standard setting items obtained by the query of the OS 313.

An example of the device capability information thus edited in step S808 is illustrated in FIGS. 10A and 10B.

In FIGS. 10A and 10B, reference numeral 1001 denotes setting items of "psk: PageMediaSize". In addition to the paper sizes present in FIGS. 6B and 6C, A2, A1, A0, B5, and B3 have been added as setting values. Reference numeral 1002 denotes setting items of "ns0000: PageOutputMediaSize." The setting values of these items are paper sizes supported by the cloud printing compatible printer 104, and A5, A4, A3, B5, B4, and Letter are described. In addition, assume that a setting value referred to as "match document size" ("ns0000: MatchPageMediaSize") for performing size-mixed printing is added. Reference numeral 1003 ("ns0000: SingleJobMixedPageMediaSizePrint") denotes setting items of "handle size-mixed printing in single job". The setting items includes a setting item for controlling handling of size-mixed printing, which is printing for when different paper sizes are specified for each page. In the example of FIGS. 10C to 10E, there are two types of setting values corresponding to ON ("ns0000: Enable") and OFF ("ns0000: None"). If in this item ON can be set as a setting value, the cloud printing compatible printer 104 can interpret a paper size setting for each page and print while switching paper sizes. If this item is not present or set to OFF, assume that the print setting expansion application 312 generates print data split into jobs between pages where the paper size changes.

Then, in step S809, the print setting expansion application 312 passes the edited device capability information to the OS 313. Thus, the OS 313 stores the device capability information obtained from the print setting expansion application 312 in association with the print queue. When the OS 313 updates the device capability information, in step S810 an object for triggering the display of a UI of the print setting expansion application 312 becomes enabled. The object for triggering the display of a UI of the print setting expansion application 312 is, for example, an object (other settings) 904 of FIG. 9. Until the processing of step S810 is completed, the object 904 is grayed out and the print setting screen of the print setting expansion application 312 is not displayed even if the user clicks it. When the processing of step S810 is completed, the gray-out of the object 904 cleared and the user will be able to select the object 904. In the object 906 of FIG. 9 that is for setting a paper size, a paper size added to the "psk: PageMediaSize" by the print setting expansion application 312 in step S808 can be selected.

Assume that in addition to the time of printing, when setting the paper size of a document in the document generation application 315, if the print queue selected by the document generation application 315 is associated with the print setting expansion application 312, the processing of steps S801 to S809 is performed. At this time, regarding the print queue to be selected, the document generation application 315 may display a UI for selection to prompt the user to make a selection or if a printer is already selected using the object 901 of the screen of FIG. 9, that print queue may be used. Alternatively, if a selection using the screen of FIG. 9 has not been made, the print queue of the default printer set in the OS 313 may be used. Thus, even when the document generation application 315 sets the paper size of the document, a paper size added to the "psk: PageMediaSize" by the print setting expansion application 312 in step S808 can be selected.

When the user thus selects the object 904, the print setting expansion application 312 starts and in step S811 displays print setting screens as illustrated in FIGS. 12A to 12D, for example. These print setting screens do not depend on the type of the document generation application 315 to be used.

Figure 11A:
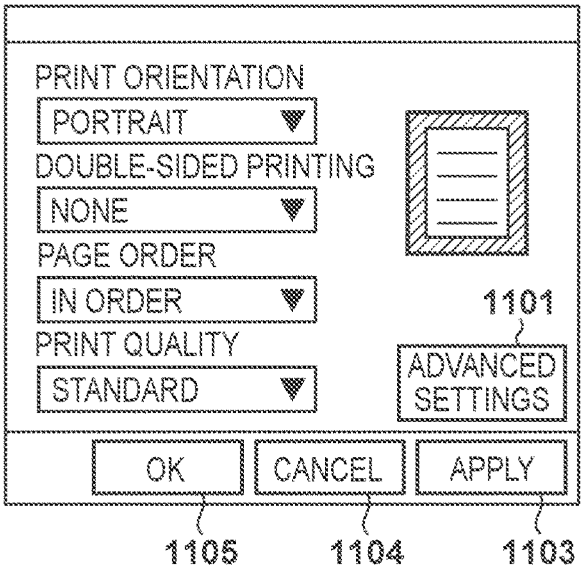
FIGS. 11A to 11D depict views illustrating examples of a standard print setting screen for when the print setting expansion application is not associated with a selected print queue in the first embodiment.

If the print setting expansion application 312 is not associated with the selected print queue, a standard print setting screen provided in advance in the OS 313 is displayed as in FIG. 11A, for example.

FIGS. 11A to 11D depict views illustrating examples of a standard print setting screen for when the print setting expansion application 312 is not associated with a selected print queue.

Figure 11B:
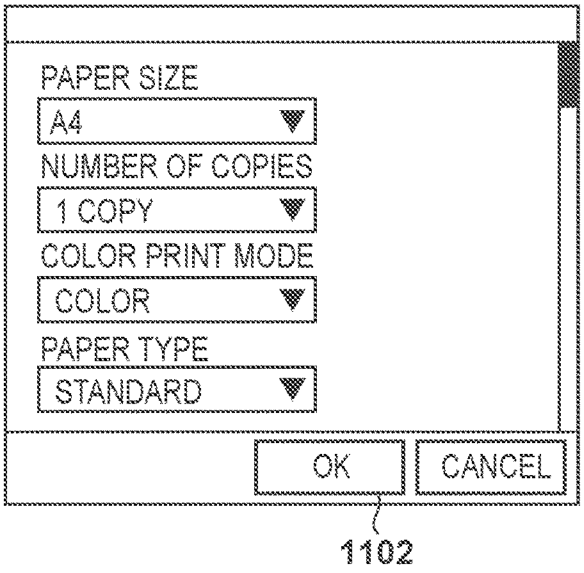
Figure 11C:
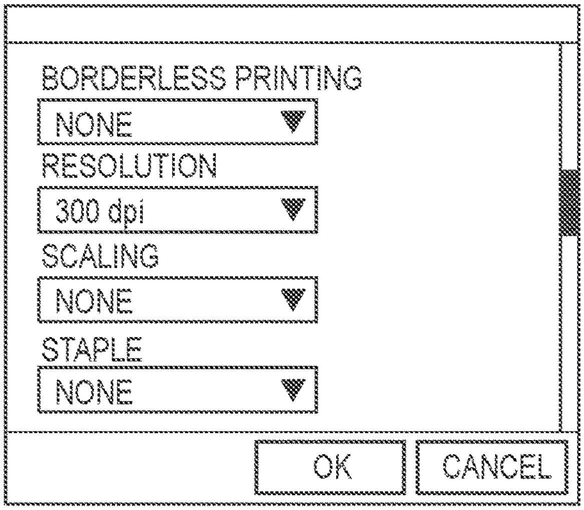
Figure 11D:
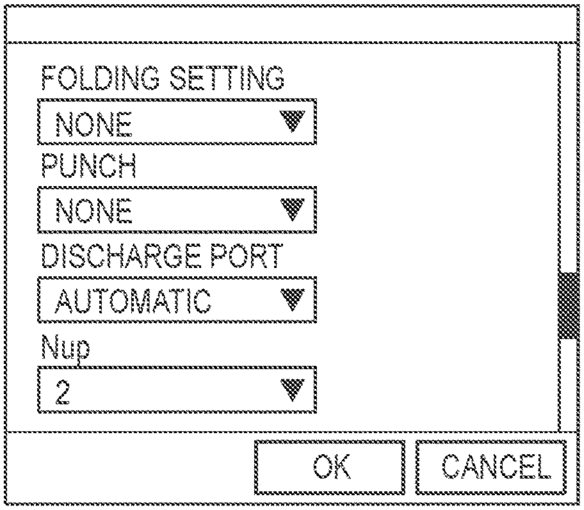

In the standard printing screen of FIG. 11A, an advanced printing screen of FIG. 11B is displayed by pressing an advanced settings button 1101 and displays an advanced printing screen for setting items that cannot be displayed in FIG. 11A. The advanced print screen illustrated in FIG. 11B can be scrolled by operating a scroll bar, and print settings can be made for a plurality of setting items supported by the OS 313 as in FIGS. 11C and 11D. By selecting an OK button 1102 in FIG. 11B, the set print settings can be stored and FIG. 11A can be returned to. An apply button 1103 of FIG. 11A is a button for storing the print settings set in this screen, and a cancel button 1104 is a button for returning to the screen of FIG. 9 without storing the print settings. When an OK button 1105 of FIG. 11A is selected, the print settings set on the screen are stored, and the screen of FIG. 9 is returned to. In FIGS. 11A to 11D, print setting items and attribute values uniquely defined by the printer vendor cannot be set. In addition, since the print setting expansion application 312 is not associated, a paper size added to "psk: PageMediaSize" by the print setting expansion application 312 cannot be set.

The description of the print setting expansion application 312 is returned to.

FIGS. 12A to 12D depict views illustrating examples of a standard print setting screen for when the print setting expansion application 312 is associated with a selected print queue.

Figure 12A:
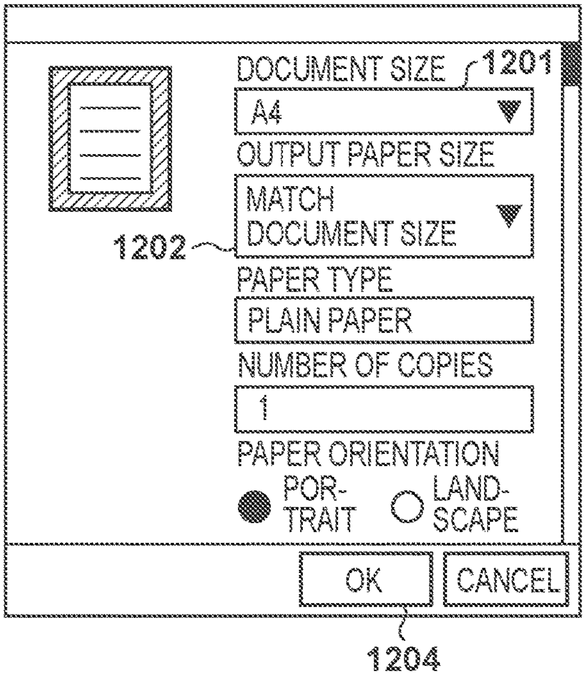
FIGS. 12A to 12D depict views illustrating examples of a print setting screen for when the print setting expansion application is associated with a selected print queue in the first embodiment.
Figure 12B:
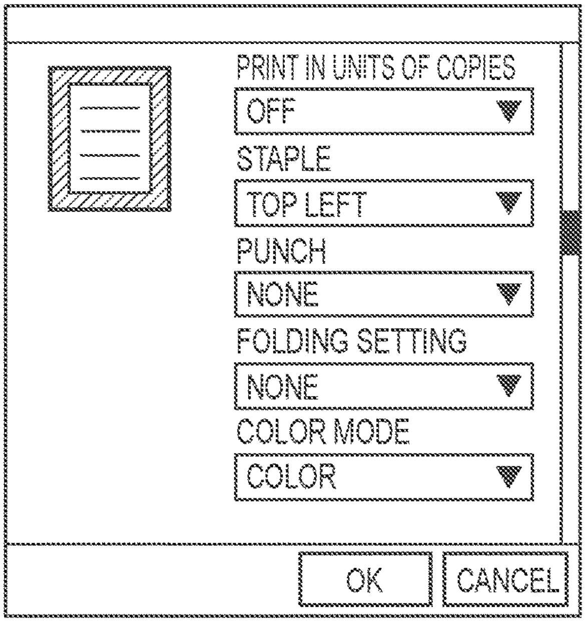
Figure 12C:
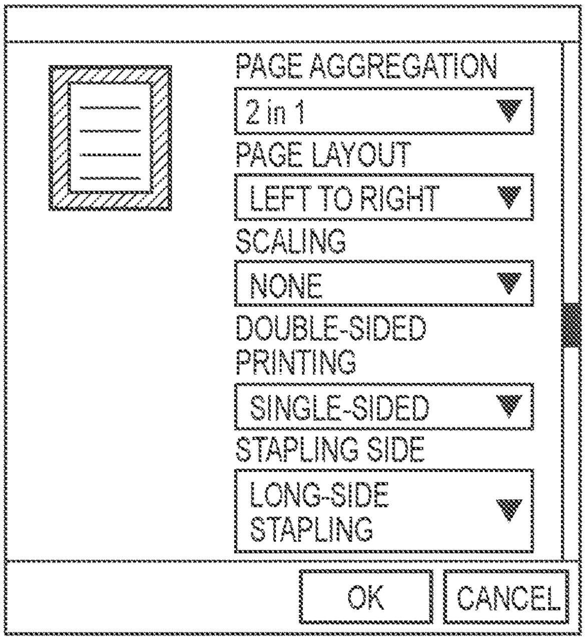

The print setting expansion application 312 receives the print setting information generated based on the print setting capability information that the OS 313 generated from the device capability information and displays an extended print setting screen illustrated in FIG. 12A, for example. The extended print setting screen can be scrolled by operating a scroll bar as illustrated in FIGS. 12A to 12D, and setting values of various print setting items can be set.

For example, "document size" of a setting item 1201 of FIG. 12A is print setting information corresponding to "psk: PageMediaSize" of FIGS. 10A to 10C. In the following explanation, assume that a document size represents a paper size designated by "psk: PageMediaSize" of the print setting information. In addition, "A4" which is an option of the document size is print setting information corresponding to "psk: ISOA4" of FIG. 10A. Similarly, "output paper size" of a setting item 1202 is print setting information corresponding to the "ns0000: PageOutputMediaSize" of FIGS. 10D and 10E. In the following explanation, an output paper size represents a paper size designated by "ns0000: PageOutputMediaSize" of the print setting information, and the output paper size is determined according to this setting. In addition, "match document size" which is an option for the output paper size is print setting information corresponding to "ns0000: MatchPageMediaSize" of FIG. 10D.

Regarding the document size, a paper size set in the document generation application 315 is designated; however, if the size is not designated by the document generation application 315, assume that the print setting expansion application 312 designates the default size (e.g., A4). In the first embodiment, when the paper size changes depending on the page, assume that the paper size of the first page is selected and displayed as the document size. When the document size is changed in the setting item 1201 and the setting is stored by an object (OK) 1204 to be described later being pressed, the setting value of "psk: PageMediaSize" of the print setting information is changed. However, if the document generation application 315 re-designates the document size that it holds as the print setting information at the time of a print instruction in step S813, the change in the setting item 1201 will ultimately not be reflected in the printing.

The output paper size is an item in which the size of paper to be actually printed is designated. The output paper size is a setting item unique to the printer vendor and is a setting item not designated by the document generation application 315. For this reason, assume that "match document size" is displayed as an option in the initial state. If "match document size" is designated for the output paper size, the print setting expansion application 312 generates the print data according to the document sizes of respective pages designated by the document generation application 315. For example, when the document sizes of all pages are A4, print data for printing all pages on A4 paper is generated. If the document size of the first page is A4 and the document size of the second page is A3, the print data for printing the first page on A4 paper and the second page on A3 paper is generated. In addition, if a specific paper size other than "match document size", such as A5, is specified for the output paper size, the print setting expansion application 312 generates print data for printing all pages on the designated A5 paper. At this time, the print data is generated by enlargement or reduction being performed as necessary. When the output paper size is changed in the setting item 1202 and the setting is stored by the object (OK) 1204 to be described later being pressed, the setting value of "ns0000: PageOutputMediaSize" of the print setting information is changed. Since the setting of the output paper size is a setting item unique to the printer vendor, unlike the document size the value thus set in the print setting information is reflected in the printing without being changed by the document generation application 315 at the time of executing printing.

Figure 12D:
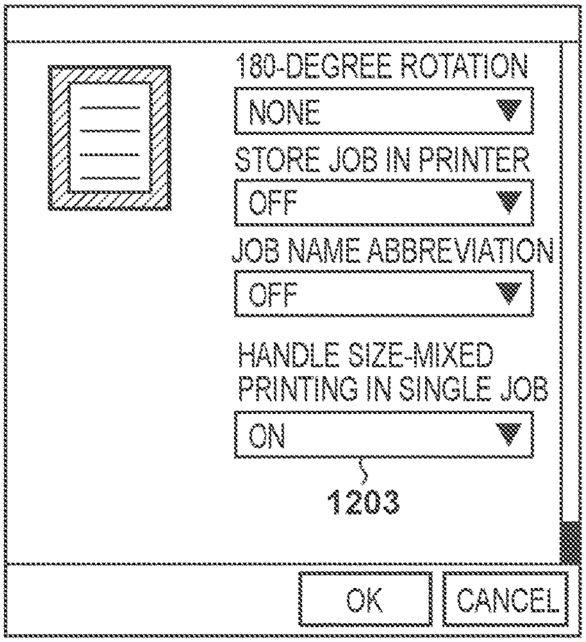

"Handle size-mixed printing in single job" of a setting item 1203 of FIG. 12D is print setting information corresponding to "ns0000: SingleJobMixedPageMediaSizePrint" of FIG. 10E. "ON" displayed as an option is print setting information corresponding to "ns0000: Enable" of FIG. 10E. The behavior of this setting will be described in a print data generation flow of the print setting expansion application 312 of FIGS. 16A and 16B.

In this way, the print setting expansion application 312 can convert device capability information including setting items unique to the printer vendor into setting values and display an extended print setting screen. Upon being installed, the print setting expansion application 312 can also display print setting items unique to the printer vendor in the extended print setting screen. Therefore, in the extended print setting screen illustrated in FIGS. 12A to 12D, setting items and setting values that cannot be set in the screen illustrated in FIGS. 11A to 11D provided by the OS 313 can be set.

A user selects the object (OK) 1204 in the screen of FIG. 12A displayed by the print setting expansion application 312. The object 1204 is an object for confirm print settings with the content of that screen. The print setting expansion application 312 provides a function for the user to change print settings as desired and, if changed, stores those setting values. For example, assume that the user changed the output paper size from A4 to A3 on the UI. In such a case, the print setting information held by the print setting expansion application 312 changes from A4 to A3. When the object 1204 is selected, the print setting expansion application 312 obtains the print setting information processed in the control of the print setting screen from the print setting screen and passes the print setting information to the OS 313.

When the print setting information is thus passed to the OS 313, in step S812 the print setting expansion application 312 terminates the display of the print setting screen illustrated in FIGS. 12A to 12D. When the processing of step S812 is completed, the print setting screen illustrated in FIG. 9 is displayed. At this time, the print setting screen to be displayed is a screen in which the setting values set by the print setting expansion application 312 are set.

Next, when the user selects an object (print) 905 on the screen illustrated in FIG. 9, in step S813 a print instruction is inputted to the OS 313 from the document generation application 315. The OS 313 executes processing related to printing based on the print instruction inputted through the document generation application 315.

Upon being instructed to perform printing, in step S814 the OS 313 generates intermediate data based on the instruction from the document generation application 315 and passes the generated intermediate data and the print setting information edited in the print setting screen to the print setting expansion application 312. Here, the intermediate data is data generated before being converted into print data such as Page Description Language (PDL), and for example, XML Paper Specification (XPS) data corresponds to this. The print setting information is also included in the intermediate data.

Upon receiving the intermediate data and the print setting information from the OS 313, in step S815 the print setting expansion application 312 generates print capability information and print data based on the intermediate data and the print setting information. Print data refers to PDL such as a Portable Document Format (PDF) file, and specifically, print capability information is information in which print setting information is described using attribute values defined by IPP. Then, in step S816, the print setting expansion application 312 passes the generated print data and print capability information to the print queue of the OS 313.

Steps S814 to S816 are processing for when the print setting expansion application 312 associated with the print queue is installed on the client terminal 101. In addition, a configuration may be taken such that when it can be determined that print settings that cannot be reflected without the print setting expansion application 312 are not set and the print setting expansion application 312 does not need unique processing, the print setting expansion application 312 receives the intermediate data as a PDF. In such a case, the received PDF may be passed as is as print data to the OS.

Meanwhile, when the print setting expansion application 312 is not installed on the client terminal 101, in step S817 the client terminal 101 performs processing to be described later. The OS 313 generates XPS data, edits the page layout, converts the XPS data into a predetermined format, and in step S817 generates print data and print capability information. Here, the predetermined format is, for example, PDF, PWG-Raster, and the like. In step S818, the OS 313 transmits the print data and the print capability information passed from the print setting expansion application 312 or the print data and the print capability information generated by the OS 313 to the cloud printing service 321 via the print queue. In step S819, the cloud printing service 321 transmits the print data and the print capability information passed from the client terminal 101 to the cloud printing compatible printer 104. In the first embodiment, when the cloud printing service 321 receives the print data and the print capability information, the received print data and the capability information are transmitted to the cloud printing compatible printer 104. However, the cloud printing compatible printer 104 may periodically query the cloud printing service 321 to obtain unprinted print data and print capability information corresponding to that print data.

With the above, print data in which print settings performed using the print setting expansion application 312 are reflected can be transmitted to the cloud printing compatible printer 104 via the cloud printing service 321.

Figure 13A:
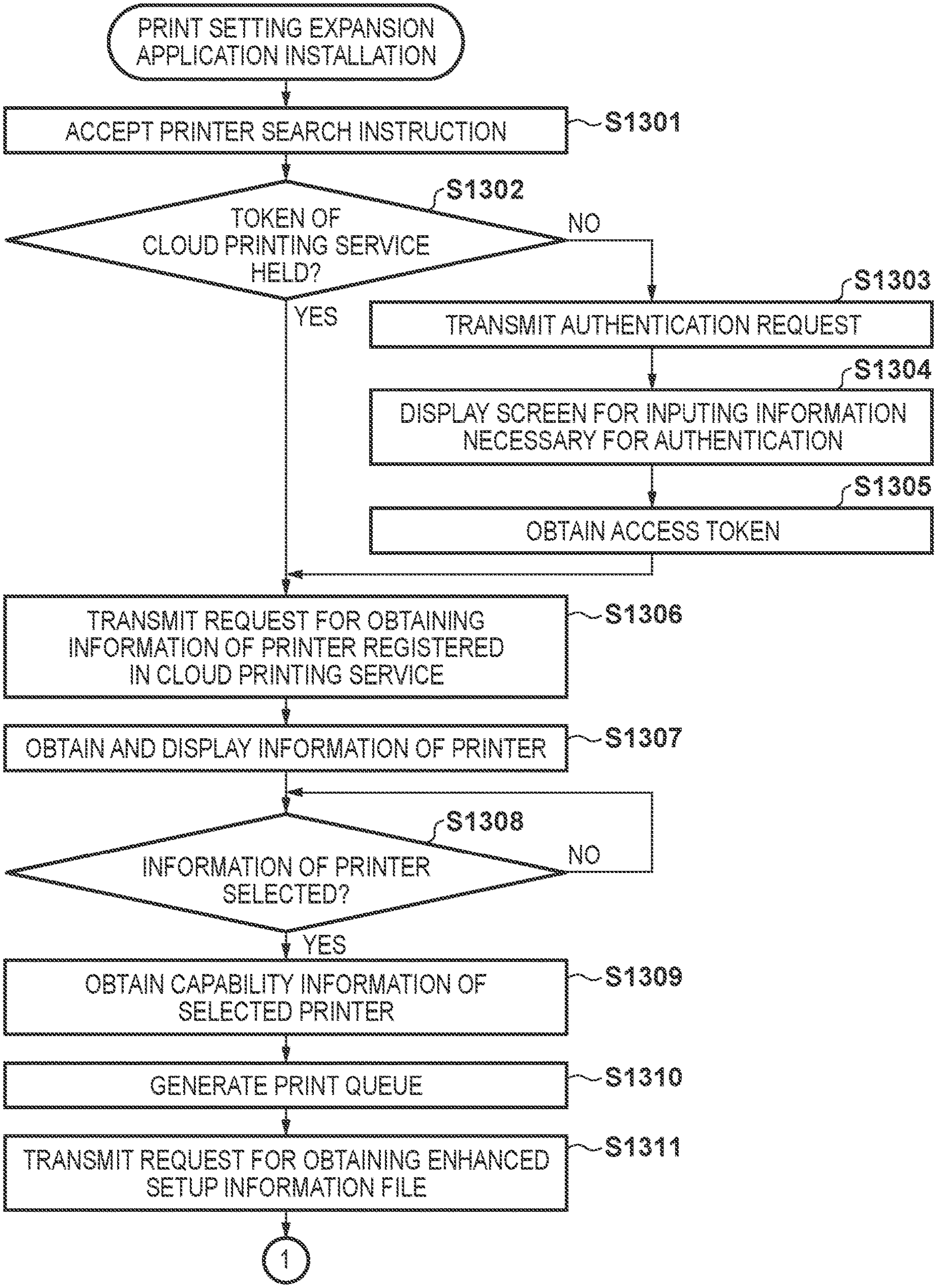
FIGS. 13A and 13B are flowcharts for explaining processing of an OS until the print setting expansion application is installed on the client terminal in the first embodiment.
Figure 13B:
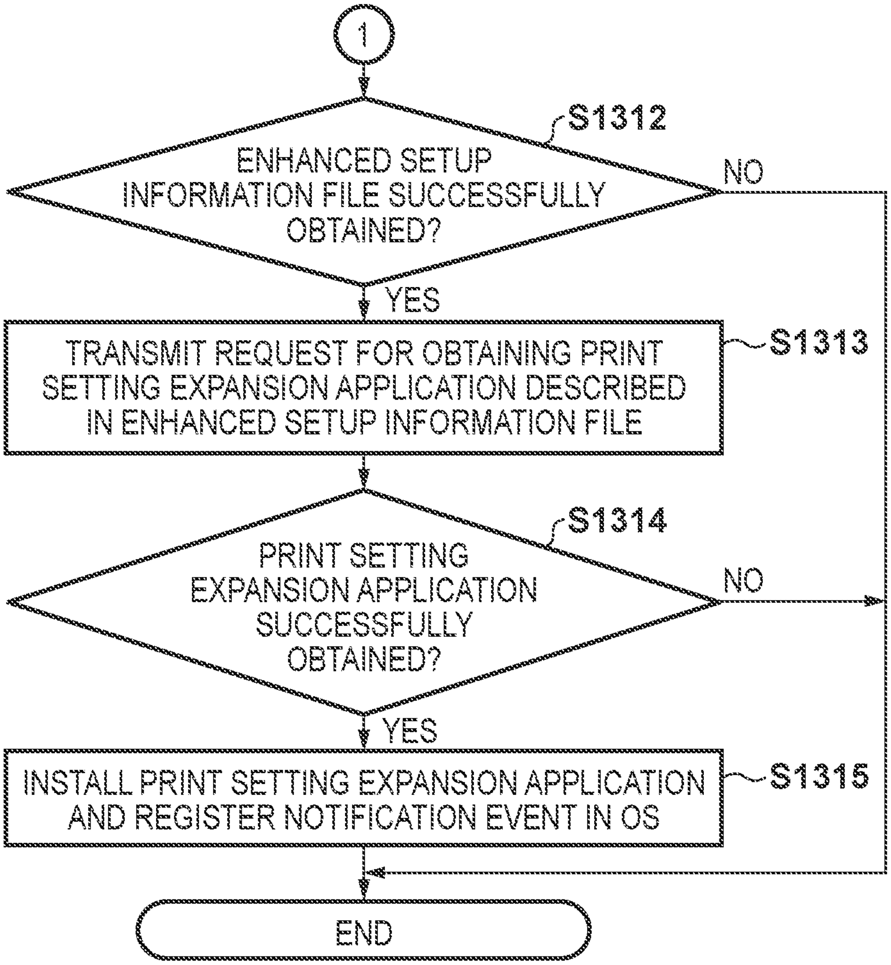

FIGS. 13*a* and 13B are flowcharts for explaining processing of the OS 313 until the print setting expansion application is installed on the client terminal 101 in the first embodiment. A program for executing the processing described in the flowchart is stored in the storage 214 of the client terminal 101, and the program is deployed in the memory 213 of the client terminal 101 and the processing is realized by the CPU 212 executing the deployed program.

First, in step S1301, the CPU 212 displays the screen illustrated in FIG. 4 and accepts a printer search instruction from a user. When the user selects the object 401 of FIG. 4, the CPU 212 accepts the printer search instruction. Next, the processing proceeds to step S1302, and the CPU 212 determines whether an access token of the cloud printing service 321 is stored. The client terminal 101 stores an access token for obtaining information from the cloud printing service 321 for each user who logs in to the client terminal 101. The CPU 212 determines whether an access token associated with the user logged in to the client terminal 101 is stored. If the access token is stored, the CPU 212 advances the processing to step S1306. Meanwhile, if the access token is not stored, the processing proceeds to step S1303, and the CPU 212 transmits an authentication request to the cloud printing service 321. The CPU 212 then receives a URL from the cloud printing service 321 that is used to display a screen for inputting information necessary for authentication. In step S1304, the CPU 212 accesses the received URL, displays the screen for inputting information used for authentication, and receives authentication information inputted through the screen. Here, the authentication information is, for example, a user ID (user identifier) and a password. In step S1305, the CPU 212 transmits the inputted authentication information to the cloud printing service 321, obtains the access token if authentication by the cloud printing service 321 is successful, and the processing proceeds to step S1306. If the authentication is unsuccessful, the CPU 212 cannot obtain the access token and terminates the processing illustrated in FIGS. 13A and 13B.

In step S1306, the CPU 212 uses the access token to transmit a request for obtaining the information of printers registered to the cloud printing service 321 to the cloud printing service 321. Thus, the cloud printing service 321 selects the information of printers that can be used by the user identified by the received access token and transmits the information to the client terminal 101. Here, printer names registered in association with the printers that can be used by the user identified by the access token received from the client terminal 101 and the HWIDs of the printers are transmitted to the client terminal 101.

Then, the processing proceeds to step S1307, and the CPU 212 displays the printer information obtained from the cloud printing service 321 on the display unit 216 of the client terminal 101. By performing the display of step S1307, the printer information is displayed in a list as illustrated in the region 402 of FIG. 4, for example.

Next, in step S1308, the CPU 212 determines whether the printer information has been selected in the region 402 of FIG. 4. The CPU 212 repeats the processing of step S1308 until the printer information is selected. When the printer information is selected, the processing proceeds to step S1309, and the CPU 212 transmits a request for obtaining capability information of the selected printer to the cloud printing service 321. Here, the cloud printing service 321 is queried for setting items pre-registered in the OS 313.

Next, the processing proceeds to step S1310, and the CPU 212 updates the device capability information stored in the client terminal 101 based on the capability information of the printer obtained from the cloud printing service 321 and generates a print queue. Then, the processing proceeds to step S1311, and the CPU 212 transmits a request for obtaining the enhanced setup information file 700 to the online supporting service 351. The obtainment request includes the HWID of the printer. Then, the processing proceeds to step S1312, and the CPU 212 determines whether the enhanced setup information file 700 has been obtained successfully, and if the enhanced setup information file 700 has been obtained successfully, the processing proceeds to step S1313. Meanwhile, if the enhanced setup information file 700 has not been obtained successfully, the CPU 212 terminates the processing described in FIGS. 13A and 13B.

In step S1313, the CPU 212 transmits a request for obtaining the print setting expansion application described in the obtained enhanced setup information file 700 to the application management service 331. The CPU 212 obtains the application identifier of the print setting expansion application from the enhanced setup information file 700, designates the obtained application identifier, and transmits a request for obtaining that print setting expansion application to the application management service 331. Then, the processing proceeds to step S1314, and the CPU 212 determines whether the print setting expansion application has been obtained successfully, and if the print setting expansion application has not been obtained successfully, the CPU 212 terminates the processing described in FIGS. 13A and 13B. If the print setting expansion application has been obtained successfully, the processing proceeds to step S1315, and the CPU 212 installs the obtained print setting expansion application and registers the application identifier of the print setting expansion application in association with the print queue. In addition, an event indicating the timing of notification is registered in the OS 313. Here, registration is performed such that when the print queue associated with the print setting expansion application is selected in the print setting screen displayed by the document generation application 315, the print setting expansion application is notified of an event. The above is the processing until the print setting expansion application 312 is registered in the client terminal 101.

Next, processing for the client terminal 101 to perform print settings using the installed print setting expansion application 312 and generate print data will be described with reference to FIG. 14.

Figure 14:
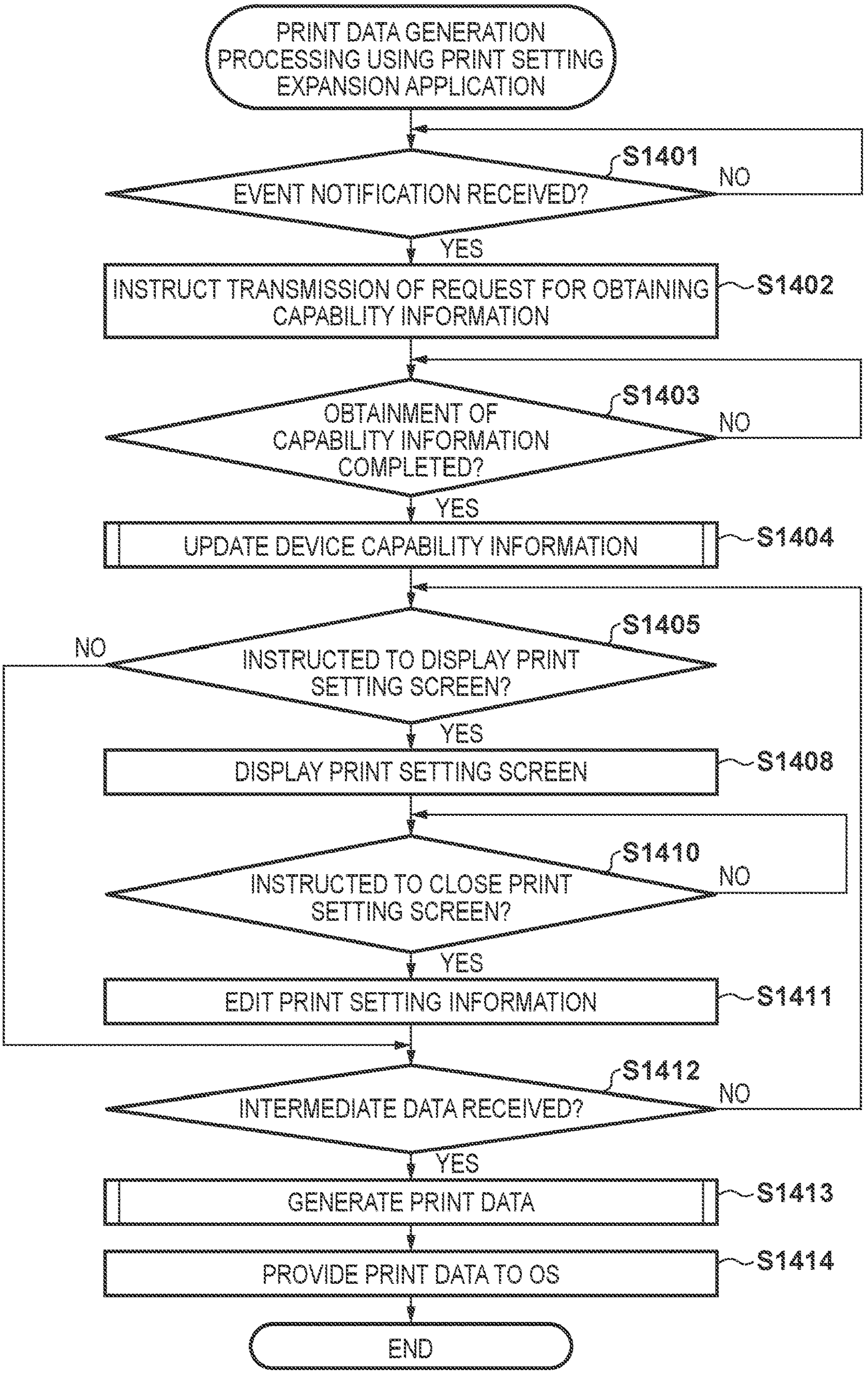
FIG. 14 is a flowchart for explaining processing for the client terminal according to the first embodiment to perform print settings using the print setting expansion application and generate print data.

FIG. 14 is a flowchart for explaining processing for the client terminal 101 according to the first embodiment to perform print settings using the print setting expansion application 312 and generate print data. A program for executing the processing is stored in the print setting expansion application 312, and the program is deployed in the memory 213 of the client terminal 101 and executed by the CPU 212.

First, in step S1401, the CPU 212 determines whether an event notification has been received. Here, the event is an event issued by the OS 313 and an event for notifying the print setting expansion application 312 of the timing registered in step S1315 of FIG. 13B. In step S1401, when the event notification is not received, the CPU 212 repeats the processing of step S1401. Upon receiving the event notification in step S1401, the processing proceeds to step S1402 and the CPU 212 transmits a request for obtaining capability information to the cloud printing service 321. Here, the CPU 212 transmits a request for obtaining capability information for setting items set in the print setting expansion application 312 to the cloud printing service 321. Here, capability information is also obtained for setting items not obtained in step S1306 of FIG. 13A. Then, the processing proceeds to step S1403, and the CPU 212 determines whether the obtainment of capability information has been completed and repeats the processing of step S1403 if the obtainment of capability information has not been completed. If it is determined in step S1403 that the obtainment of capability information has been completed, the processing proceeds to step S1404, and the CPU 212 updates the device capability information using the obtained capability information. By performing the processing of step S1404, the capability information of setting items not obtained by the OS 313 is stored in the client terminal 101. Details of the processing of step S1404 will be described later with reference to the flowchart of FIG. 15.

Next, the processing proceeds to step S1405, and the CPU 212 determines whether an instruction for the print setting expansion application 312 to display the print setting screen has been accepted. The instruction for the print setting expansion application 312 to display the print setting screen is, for example, an instruction issued based on a user operation, such as selection of the object (other settings) 904 of FIG. 9. If it is determined in step S1405 that an instruction to display the print setting screen has not been accepted, the processing proceeds to step S1412. Meanwhile, if it is determined that the instruction to display the print setting screen has been accepted, the processing proceeds to step S1408. In step S1408, the CPU 212 displays, for example, the print setting screen illustrated in FIG. 12A based on the device capability information updated in step S1404. Then, a user operation for selecting a setting value is accepted via the displayed print setting screen. Then, the processing proceeds to step S1410, and the CPU 212 determines whether an instruction according to the OK object 1204 to terminate the display of the print setting screen by the print setting expansion application 312 has been made. When it is determined that the instruction to terminate the display of the print setting screen has not been made, the processing of step S1410 is performed. When it is determined that an instruction to terminate the display of the print setting screen has been made, the processing proceeds to step S1411. In step S1411, the CPU 212 edits the print setting information using the setting values selected in the print setting screen displayed by the print setting expansion application 312. Then, the CPU 212 terminates the display of the print setting screen by the print setting expansion application 312 and the processing proceeds to step S1412.

In step S1412, the CPU 212 determines whether the print setting expansion application 312 has received intermediate data from the OS 313. If the intermediate data has not been received, the processing proceeds to step S1405. Meanwhile, if it is determined in step S1412 that the intermediate data has been received, the processing proceeds to step S1413. In step S1413, the CPU 212 generates print data and print capability information based on the intermediate data received by the print setting expansion application 312. Here, the CPU 212 generates image data in a predetermined format based on the intermediate data and the print setting information. In addition, the CPU 212 generates print capability information described using attribute values defined in IPP based on the print setting information. In addition to the attribute values defined in IPP, description can be freely made in the print capability information. Therefore, the setting items and attribute values uniquely defined by the printer vendor can also be described in the print capability information. Details of the processing of step S1413 will be described later with reference to the flowchart of FIGS. 16A and 16B. Then, the processing proceeds to step S1414, and the CPU 212 provides the generated print data to the OS 313 and terminates the processing. Thus, the OS 313 transmits the data received via the print queue to the cloud printing service 321.

The above is a description of the flowchart for explaining the processing for when performing print settings using the print setting expansion application 312 and generating print data and print capability information.

Figure 15:
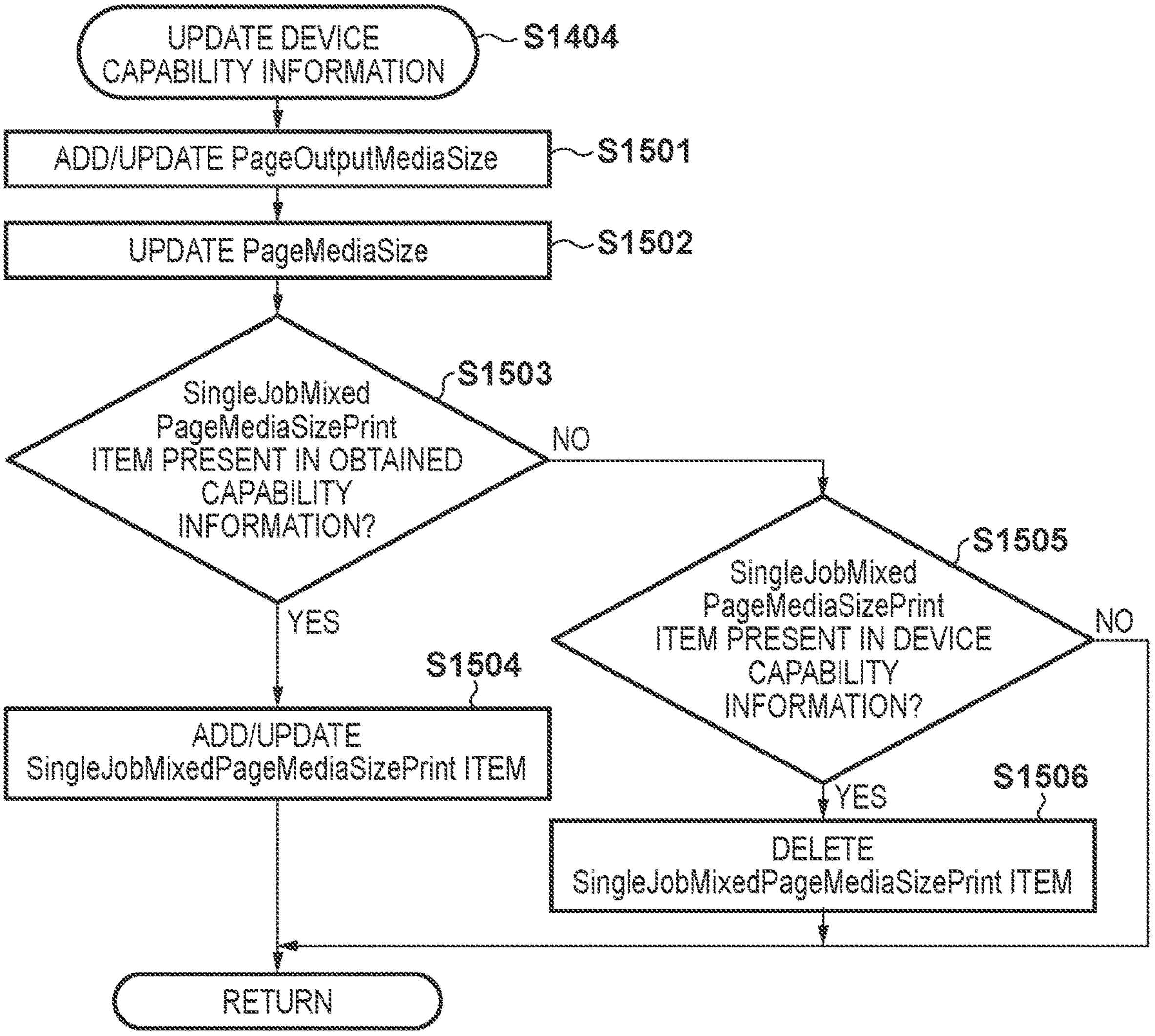
FIG. 15 is a flowchart for explaining processing for updating device capability information in step S1404 of FIG. 14 according to the first embodiment.

FIG. 15 is a flowchart for explaining processing for updating device capability information in step S1404 of FIG. 14. A program for executing the processing described in FIG. 15 is stored in the print setting expansion application 312, and the program is deployed in the memory 213 of the client terminal 101 and executed by the CPU 212.

In step S1501, the CPU 212 adds an "ns0000: PageOutputMediaSize" item unique to the printer vendor in the device capability information based on paper size information of "psk: PageMediaSize" present in the capability information obtained in step S1402. At this time, if the item is already present in the device capability information, the content of the item is updated. If there is no difference in the content, update need not be performed. At the time of addition or update, a setting value, "match document size", is included regardless of the obtained capability information. For example, assume that paper sizes supported by the printer obtained from the printer is as in "psk: PageMediaSize" of FIGS. 6B and 6C. In this case, the "ns0000: PageOutputMediaSize" item as indicated by reference numeral 1002 of FIG. 10D is added as device capability information. Regarding PageOutputMediaSize to be added at this time, the same items as PageMediaSize obtained from the printer is added. In addition, Option for allowing selection of "same paper size as document size" is added to PageOutputMediaSize. A configuration may be taken such that if PageOutputMediaSize has been added to the device capability information, the processing described in step S1501 need not be performed.

Next, processing proceeds to step S1502, and the CPU 212 updates the content of "psk: PageMediaSize" with predetermined content regardless of the capability information obtained in step S1402. This is to allow the document generation application 315 to handle paper sizes not supported by the printer. For example, assume that paper sizes supported by the printer obtained from the printer is as in "psk: PageMediaSize" of FIGS. 6B and 6C. However, as device capability information, update is performed using contents of "psk: PageMediaSize" as indicated by reference numeral 1001 of FIGS. 10A and 10B that are predetermined in the print setting expansion application 312.

Next, the processing proceeds to step S1503, and the CPU 212 determines whether an "ns0000: SingleJobMixedPageMediaSizePrint" item is present in the capability information obtained in step S1402. This is a "handle size-mixed printing in single job" item, and if the item is present, the processing proceeds to step S1504, and if the item is not present, the processing proceeds to step S1505. In step S1504, the CPU 212 adds/updates the device capability information along with the attribute values obtained with the "ns0000: SingleJobMixedPageMediaSizePrint" item. Thus, "ns0000: SingleJobMixedPageMediaSizePrint" is described as indicated by reference numeral 1003 in FIG. 10E, and "ns0000: None" and "ns0000: Enable" are described as values thereof that can be set. Thus, the CPU 212 terminates update of the device capability information.

Meanwhile, in step S1505, the CPU 212 determines whether the "ns0000: SingleJobMixedPageMediaSizePrint" item is present in the device capability information. If the item is present, the processing proceeds to step S1506, and if the item is not present, the update of device capability information is terminated. In step S1506, the CPU 212 deletes the "ns0000: SingleJobMixedPageMediaSizePrint" item present in the device capability information and terminates the update of device capability information. With step S1506, it is possible to prevent the display of a size-mixed print setting object despite the printer not supporting size-mixed printing.

Figure 16A:
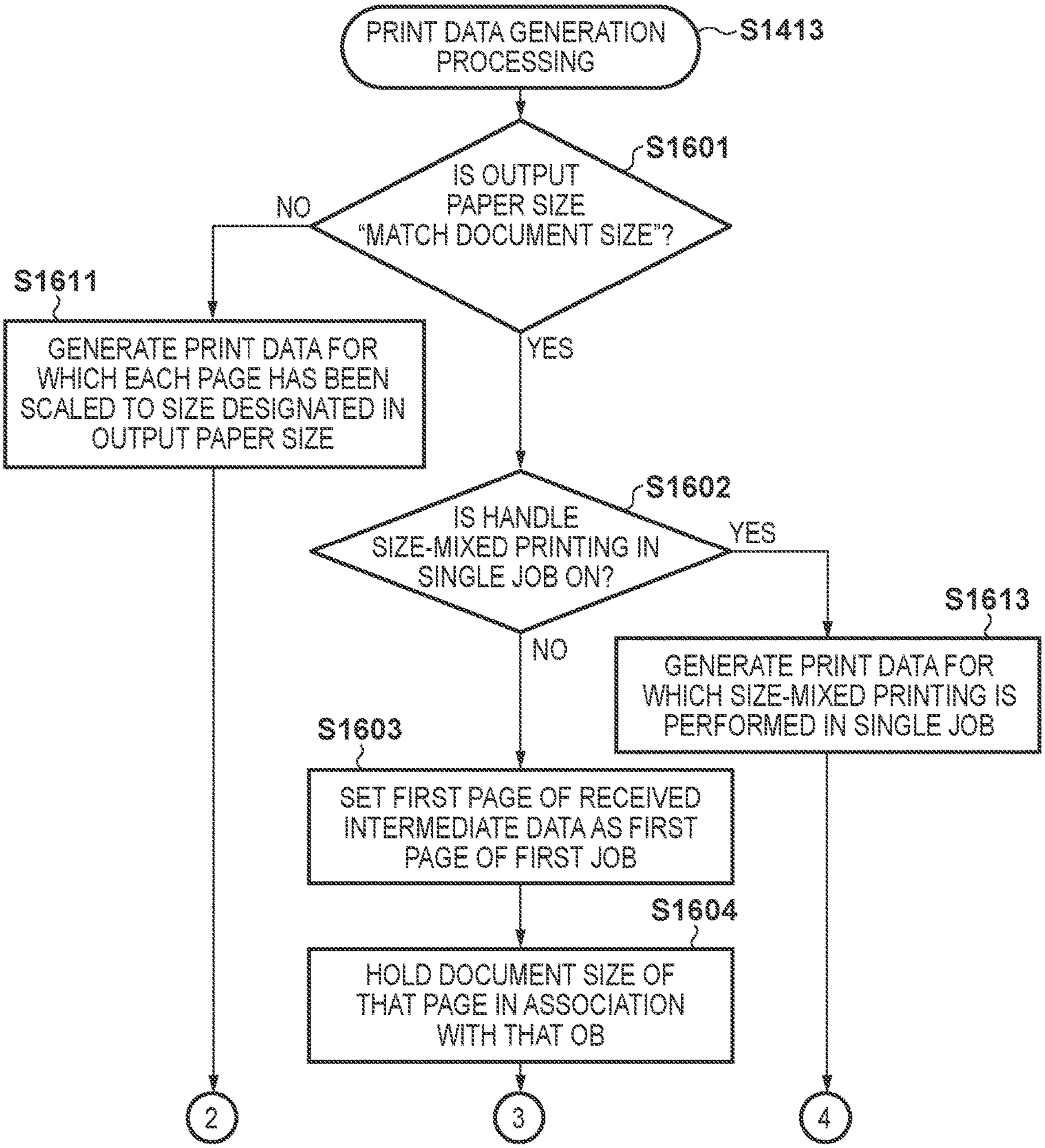
FIGS. 16A and 16B are flowcharts for explaining print data generation processing of step S1413 of FIG. 14 according to the first embodiment.
Figure 16B:
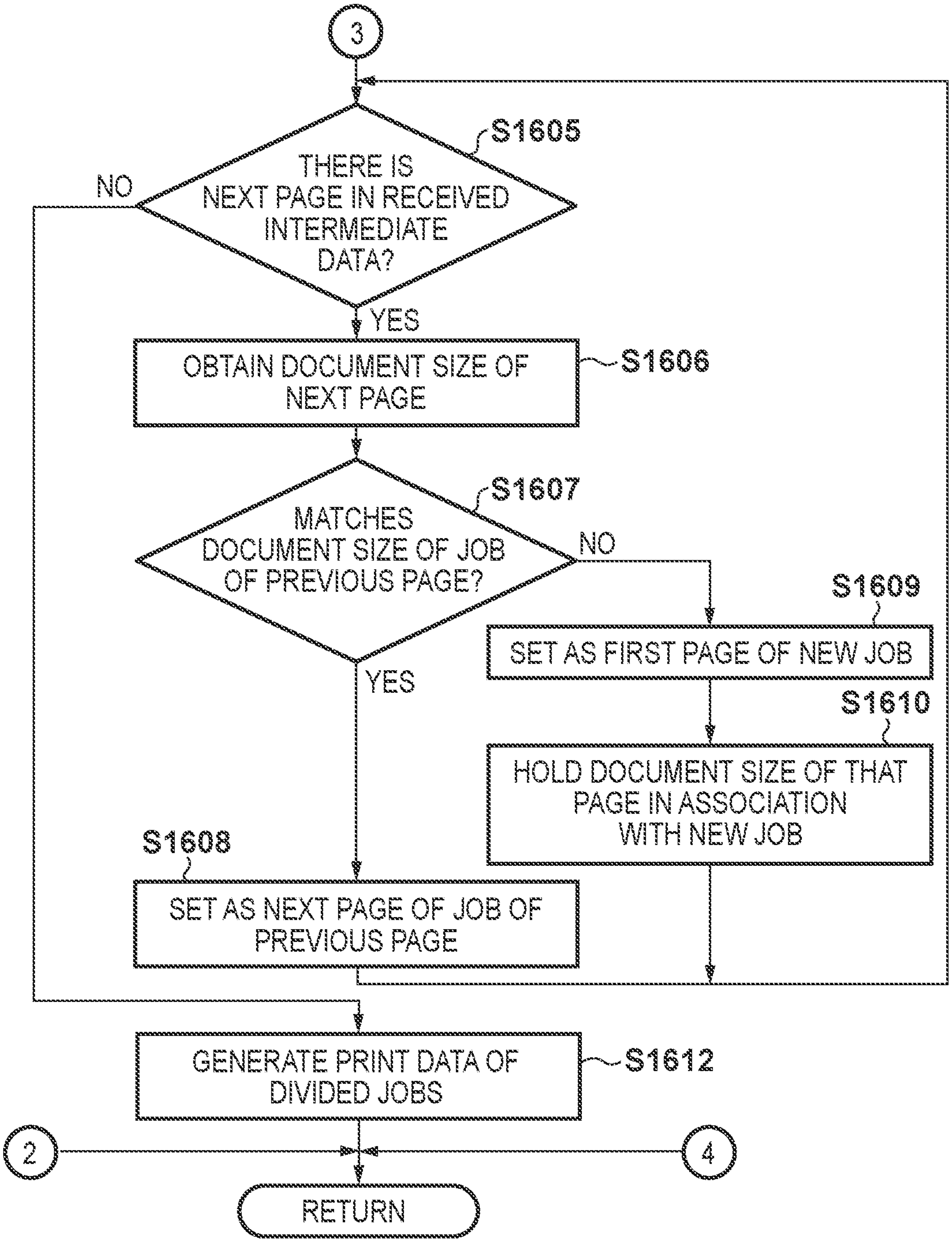

FIGS. 16A and 16B are flowcharts for explaining print data generation processing of step S1413 of FIG. 14 according to the first embodiment. A program for executing the processing is stored in the print setting expansion application 312, and the program is deployed in the memory 213 of the client terminal 101 and executed by the CPU 212.

In step S1601, the CPU 212 references print setting information of the intermediate data received from the OS 313 and determines whether the setting of the output paper size ("ns0000: PageOutputMediaSize") is "match document size". The setting value of the output paper size is a value set in the setting item (output paper size) 1202 of FIG. 12A. If the setting of the output paper size is "match document size", the processing proceeds to step S1602, and if the setting of the output paper size is other than "match document size", the processing proceeds to step S1611.

In step S1602, the CPU 212 determines whether the setting for handling size-mixed printing in a single job ("ns0000: SingleJobMixedPageMediaSizePrint") is ON based on the print setting information of the intermediate data received from the OS 313. If the setting item is ON, the processing proceeds to step S1613, and if the setting item is OFF or the item itself is not present, the processing proceeds to step S1603.

In step S1603, the CPU 212 references the intermediate data received from the OS 313 and stores the first page in the storage 214 as the first page of the first job according to the print order of pages. The processing of subsequent steps S1603 to S1610 is processing for realizing size-mixed printing by the print setting expansion application 312 dividing the job when the printer does not have the capability of handling size-mixed printing in a single job or the setting for handling size-mixed printing in a single job is OFF.

In step S1604, the CPU 212 holds the document size of the page held in step S1603 ("psk: PageMediaSize" of the print setting information of the page) in the storage 214 in association with the job. The setting value of the document size is either a value set in the setting item (document size) 1201 of FIG. 12A or a value designated by the document generation application 315 at the time of print instruction. Next, the processing proceeds to step S1605, and the CPU 212 references the intermediate data received from the OS 313 and determines whether there is a next page according to the print order of pages. If it is determined in step S1605 that there is a next page, the processing proceeds to step S1606, otherwise the processing proceeds to step S1612, In step S1606, the CPU 212 obtains the document size of the next page. Next, the processing proceeds to step S1607, and the CPU 212 references the document size of the next page obtained in step S1606 and determines whether the document size matches the document size held in association with the job of the previous page. If the document sizes are the same, the processing proceeds to step S1608, and if the document sizes are different from each other, the processing proceeds to step S1609. In step S1608, the CPU 212 holds the page for which the document size has been obtained in step S1606 as the next page of the job of the previous page in the storage 214 and returns the processing to step S1605.

Meanwhile, in step S1609, the CPU 212 holds the page for which the document size has been obtained in step S1606 as the first page of a new job, which is different from the job of the previous page, in the storage 214. Then, the processing proceeds to step S1610, and the CPU 212 holds the document size of the page held in step S1609 (i.e., document size obtained in step S1606) in association with the new job of step S1609 in the storage 214 and the processing proceeds to step S1605.

Figure 17A:
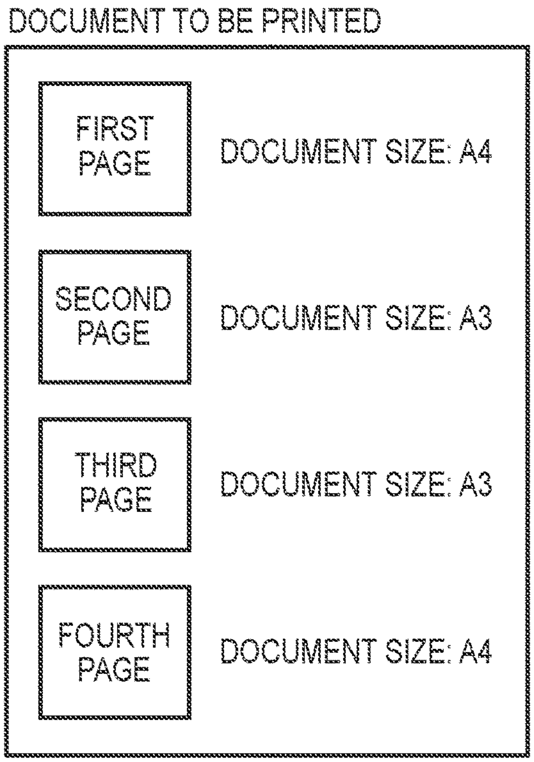
FIGS. 17A to 17C are diagrams for explaining an example of intermediate data to be generated by processing in steps S1603 to S1610 of FIGS. 16A and 16B in the first embodiment.
Figure 17C:
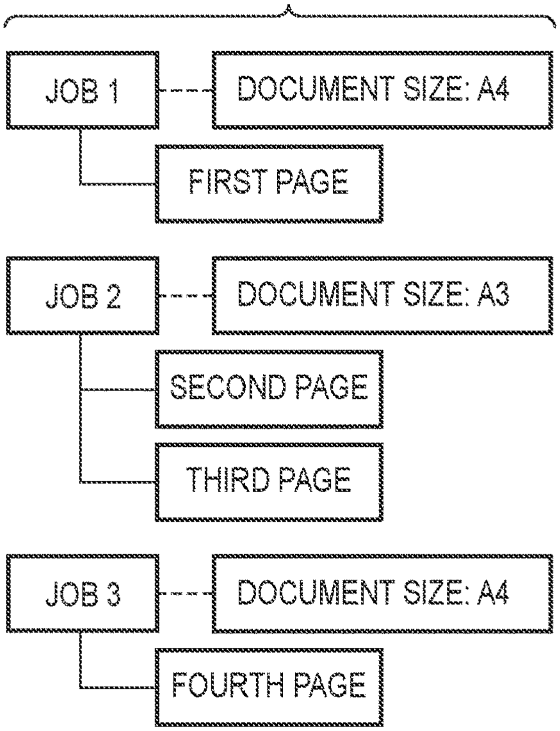
Figure 17B:
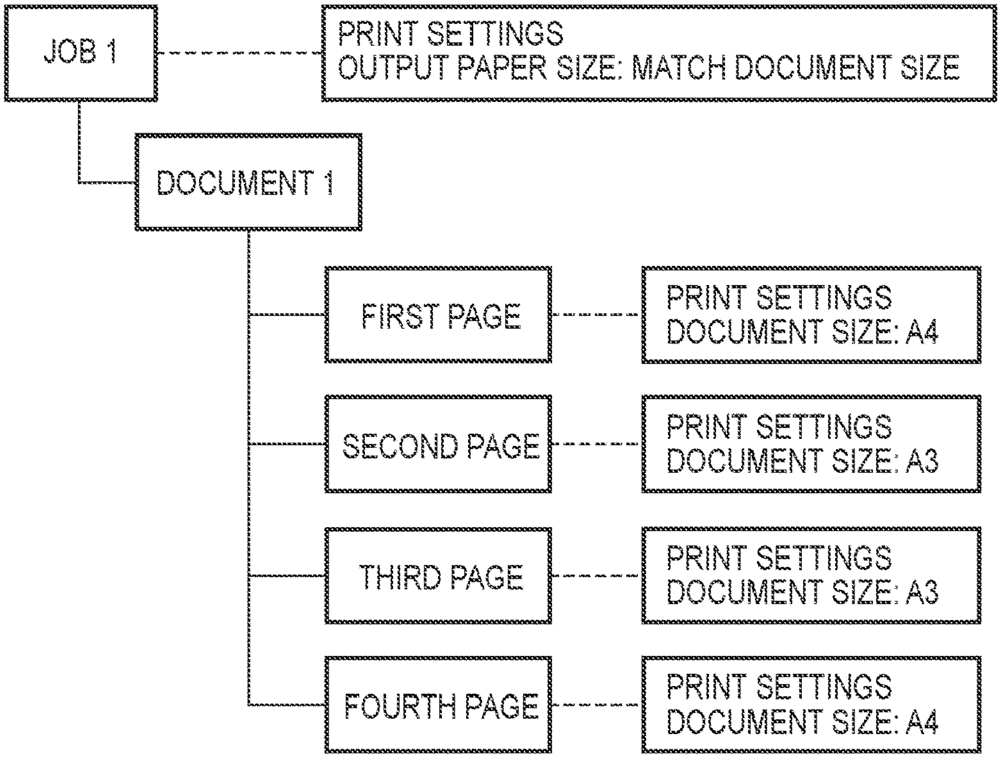

FIGS. 17A to 17C are diagrams for explaining an example of intermediate data to be generated by processing in steps S1603 to S1610 of FIGS. 16A and 16B.

For example, assume that the document to be printed is as illustrated in FIG. 17A, and the document generation application 315 designated A4 for the document size of the first and fourth pages and A3 for the document size of the second and third pages. Assume that the intermediate data received by the print setting expansion application 312 from the OS 313 at this time is FIG. 17B.

In FIG. 17B, the setting of the output paper size of the print setting information is set to "match document size" and the document sizes of respective pages are each set to information designated by the document generation application 315. When the processing of steps S1603 to S1610 is performed on such intermediate data, data for which jobs have been divided as in FIG. 17C is held in the print setting expansion application 312. That is, the pages starting from the first page of the document to be printed are divided into three jobs for respective document sizes; job 1, which is the first one, includes the first page of the document to be printed, job 2, which is the second one, includes the second and third pages of the document to be printed, and job 3, which is the third one, includes the fourth page of the document to be printed. In addition, job 1 and job 3 are held with A4 associated as the document size and job 2 is held with A3 associated as the document size. FIG. 17C is a schematically-represented diagram, and a format of data to be held may be a similar data format as that of the received intermediate data or may be another data format.

In step S1601, if the setting of the output paper size is other than "match document size", the processing proceeds to step S1611, and the CPU 212 generates print data and print capability information according to the intermediate data and terminates the processing. At this time, if the document size of the print setting information of a respective page is different from the setting of the output paper size, the print setting expansion application 312 generates print data enlarged or reduced to the paper size set in the output paper size as necessary. In addition, as the print capability information, the document size information is changed to the paper size set in the output paper size.

In addition, if it is determined in step S1605 that there is no next page, the processing proceeds to step S1612, and the CPU 212 generates print data and print capability information of each job created in the processing of steps S1603 to S1610 and terminates the processing. At this time, the document sizes associated with respective jobs are set as the document sizes of the print capability information of the respective jobs.

When it is determined in step S1602 that handle size-mixed printing in a single job is ON, the processing proceeds to step S1613, and the CPU 212 generates print data and print capability information for size-mixed printing in a single job according to the intermediate data received from the OS 313 and terminates the processing. At this time, assume that the setting for size-mixed printing is included as the print capability information. Assume that at least the print data to be generated at this time is in a format that can hold the document size in page units, such as PDF, and holds the document sizes set in the print setting information of respective pages. The cloud printing compatible printer 104 interprets the document size that each page of the print data has and prints the document with the size when the print capability information includes the setting of size-mixed printing. Thus, the size-mixed printing is realized in a single job.

The above is the details of the print data generation processing including the case where size-mixed printing is performed.

The generated print data is then passed from the OS 313 to the cloud printing compatible printer 104 through the cloud printing service 321. At this time, there are cases where even though the document sizes include a size not supported by the printer, "match document size" is designated in the output paper size and printing is performed. In such a case, assume that if the cloud printing compatible printer 104 cannot process the received print data, the cloud printing compatible printer 104 displays a screen such as in FIG. 18A on the display unit 246 and aborts the processing due to error.

Figure 18A:
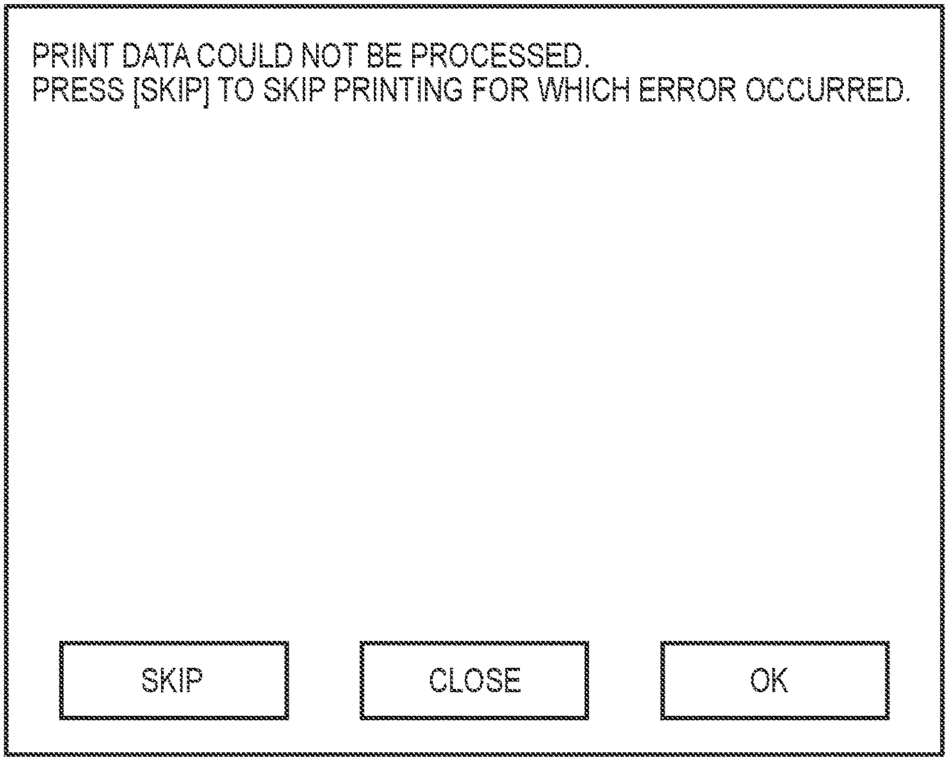
FIGS. 18A and 18B depict views illustrating examples of a screen to be displayed on the cloud printing compatible printer according to a first embodiment.
Figure 18B:
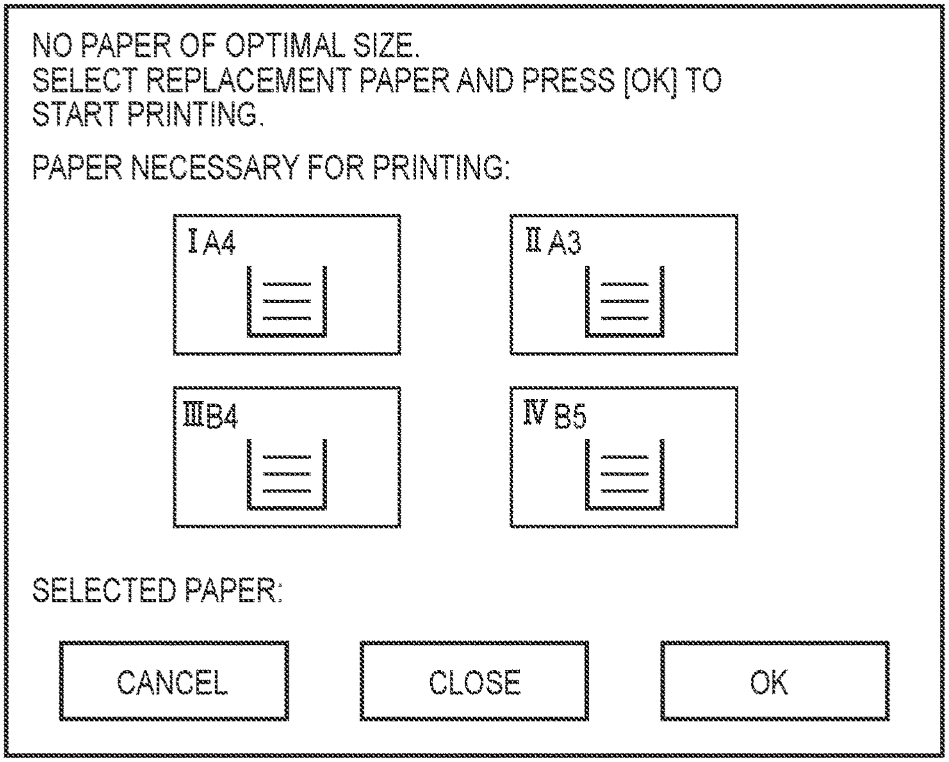

FIGS. 18A and 18B depict views illustrating examples of a screen to be displayed on the cloud printing compatible printer 104 according to the first embodiment.

A configuration may be taken such that even if similar printing is performed, when it is determined that the cloud printing compatible printer 104 can perform printing if the paper size to be outputted is changed to a supported paper size, a screen such as in FIG. 18B is displayed so as to prompt selection of a paper size. A configuration may also be taken such that even if the cloud printing compatible printer 104 supports the paper size to be outputted, if paper of that size is not set in a paper feed unit of the printer, the screen of FIG. 18B is displayed.

As described above, according to the first embodiment, when selecting a print queue associated with a general-purpose cloud printer driver or a local printer driver and generating a document, it is possible to select a paper size not supported by the printer and generate a document. In addition, at the time of printing, by allowing designation of an output paper size separately from the document size, it is possible to designate printing on a paper size supported by the printer. Moreover, when "match document size" is designated as the output paper size, even if the printer cannot process size-mixed printing in a single job, size-mixed printing is made possible by the print setting expansion application dividing the job.

In the first embodiment, in step S1603 or the like, a page or a paper size at the time of dividing a job is stored in the storage 214 of the client terminal 101 but may be stored in the memory 213 of the control unit 211.

Second Embodiment

Next, a second embodiment of the present invention will be described. In the second embodiment, even though the document sizes include a size not supported by the printer, if "match document size" is designated in the output paper size, the print setting expansion application 312 detects that when generating print data. Since the difference between the second embodiment and the first embodiment is the print data generation processing of the print setting expansion application 312, that part will be described with reference to FIGS. 19 and 20. The description of other portions in common with the first embodiment will be omitted.

Figure 19A:
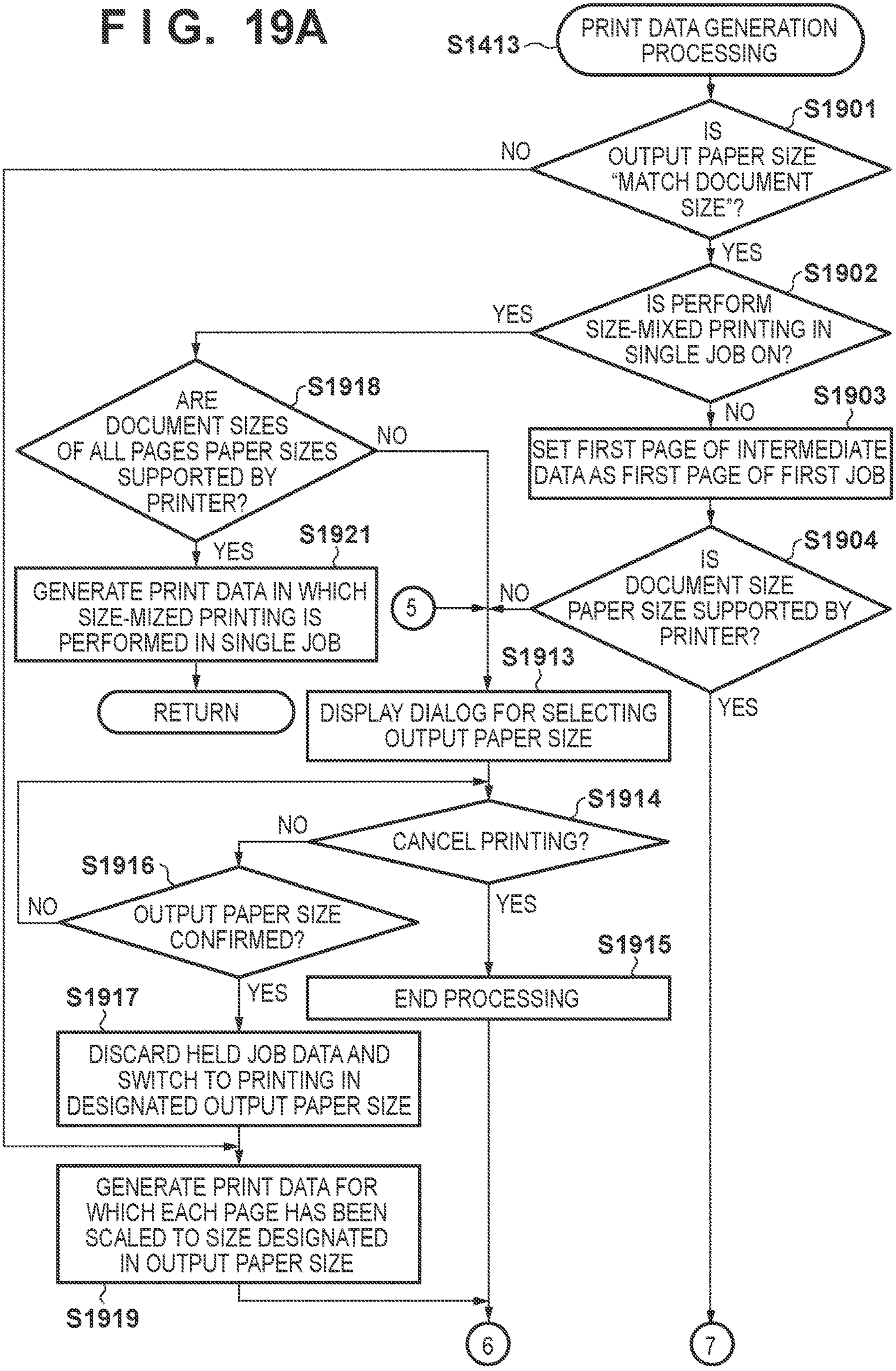
FIGS. 19A and 19B are flowcharts for explaining print data generation processing according to a second embodiment.
Figure 19B:
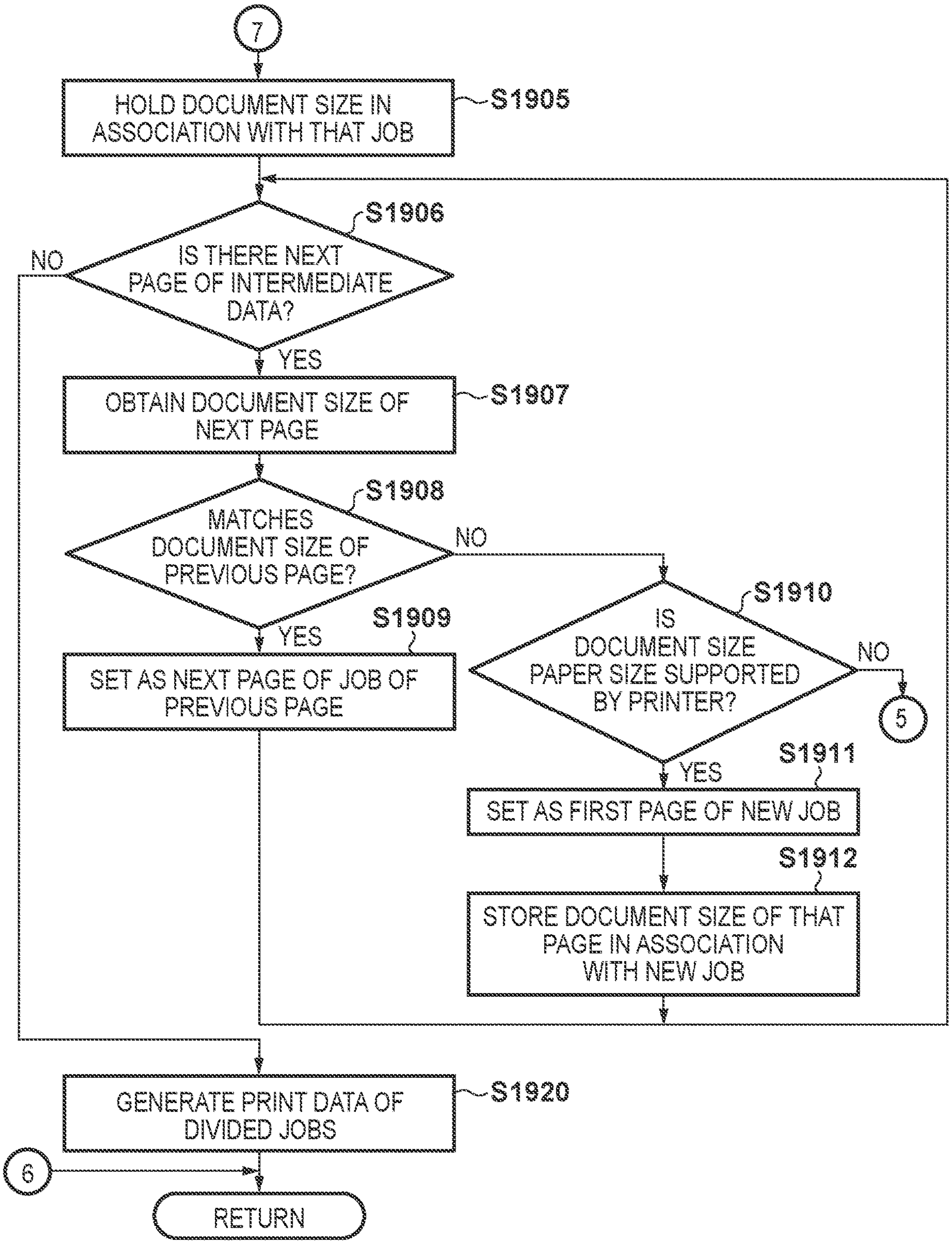

FIGS. 19A and 19B are flowcharts for explaining print data generation processing (corresponding to step S1413 of FIG. 14) according to the second embodiment. A program for executing the processing is stored in the print setting expansion application 312, and the program is deployed in the memory 213 of the client terminal 101 and executed by the CPU 212.

First, in step S1901, the CPU 212 references print setting information of the intermediate data received from the OS 313 and determines whether the setting of the output paper size ("ns0000: PageOutputMediaSize") is "match document size". If the setting of the output paper size is "match document size", the processing proceeds to step S1902, and if the setting of the output paper size is other than "match document size", the processing proceeds to step S1919.

In step S1902, the CPU 212 determines whether the setting for handling size-mixed printing in a single job ("ns0000: SingleJobMixedPageMediaSizePrint") is ON based on the print setting information of the intermediate data received from the OS 313. If the setting item is ON, the processing proceeds to step S1918, and if the setting item is OFF or the item itself is not present, the processing proceeds to step S1903. In step S1903, the CPU 212 references the intermediate data received from the OS 313 and stores the first page in the storage 214 as the first page of the first job according to the print order of pages. The processing of subsequent steps S1903 to S1912 is processing for realizing size-mixed printing by the print setting expansion application 312 dividing the job when the printer does not have the capability of handling size-mixed printing in a single job or the setting of handling size-mixed printing in a single job is OFF.

Next, the processing proceeds to step S1904, and the CPU 212 determines whether the document size of the page held in step S1903 (paper size designated in "psk: PageMediaSize" of the print setting information of that page) is a paper size supported by the cloud printing compatible printer 104. If it is determined that the paper size is supported by the cloud printing compatible printer 104, the processing proceeds to step S1905, and if it is determined that the paper size is not supported by the cloud printing compatible printer 104, the processing proceeds to step S1913. In step S1905, the CPU 212 holds the document size of the page held in step S1903 in the storage 214 in association with the job. Then, the processing proceeds to step S1906, and the CPU 212 references the intermediate data received from the OS 313 and determines whether there is a next page according to the print order of pages. If there is the next page, the processing proceeds to step S1907, and if there is no next page, the processing proceeds to step S1920. In step S1920, the CPU 212 generates print data and print capability information for each job generated in the processing of steps S1903 to S1912. At this time, the document size associated with each job is set as the document size of the print capability information of each job, and the processing is terminated.

In step S1907, the CPU 212 obtains the document size of the next page. Next, the processing proceeds to step S1908, and the CPU 212 references the document size obtained in step S1907 and determines whether the document size matches the document size held in association with the job of the previous page. If it is determined that the document sizes are the same, the processing proceeds to step S1909, and if it is determined that the document sizes are different from each other, the processing proceeds to step S1910. In step S1909, the CPU 212 holds the page for which the document size has been obtained in step S1907 as the next page of the job of the previous page in the storage 214 and returns the processing to step S1906.

Meanwhile, in step S1910, the CPU 212 determines whether the document size obtained in step S1907 is a paper size supported by the cloud printing compatible printer 104. If it is determined that the paper size is supported by the cloud printing compatible printer 104, the processing proceeds to step S1911, and if it is determined that the paper size is not supported by the cloud printing compatible printer 104, the processing proceeds to step S1913. In step S1911, the CPU 212 holds the page for which the document size has been obtained in step S1907 as the first page of a new job, which is different from the job of the previous page, in the storage 214. Then, the processing proceeds to step S1912, and the CPU 212 holds the document size of the page held in step S1911 (i.e., document size obtained in step S1907) in association with the new job of step S1911 in the storage 214 and the processing proceeds to step S1906.

In step S1904, if the document size (paper size designated in "psk: PageMediaSize" in the print setting information of the page) of the held page is not a paper size supported by the cloud printing compatible printer 104, the processing proceeds to step S1913, and the CPU 212 displays a dialogue for prompting selection of an output paper size illustrated in FIG. 20.

Figure 20:
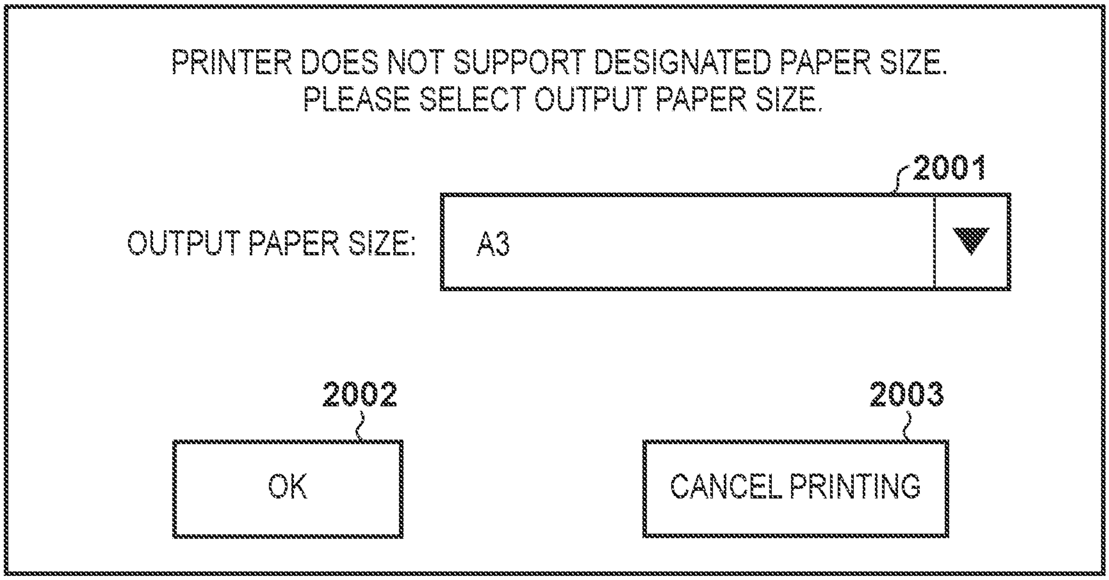
FIG. 20 depicts a view illustrating an example of a screen to be displayed by the print setting expansion application according to the second embodiment.

FIG. 20 depicts a view illustrating an example of a warning screen to be displayed by the print setting expansion application 312 according to the second embodiment.

The "output paper size" of a setting item 2001 is a setting item similar to the "output paper size" of the setting item 1202 of FIG. 12A, but assume that "match document size" is not displayed as an option in FIG. 20. Therefore, an option for the setting item 2001 is only a paper size supported by the cloud printing compatible printer 104. The initial value of the option may be any paper size supported by the cloud printing compatible printer 104, but for example, the default value of the paper size predetermined in the printer capability information is used. An object (OK) 2002 is a button for accepting an instruction for confirming the output paper size that the user selected by operating the setting item 2001. An object (cancel printing) 2003 is a button for accepting an instruction to cancel printing.

In step S1914, the CPU 212 determines whether an instruction of the object 2003 for cancelling printing has been received in the dialogue of FIG. 20. If the instruction for cancelling printing has been accepted, the processing proceeds to step S1915, and if the instruction for cancelling printing has not been accepted, the processing proceeds to step S1916. In step S1915, the CPU 212 terminates the print data generation processing and aborts execution of printing. At this time, assume that the print setting expansion application 312 does not perform the processing of step S1414 of FIG. 14 and returns that printing has been cancelled to the OS 313.

Meanwhile, when it is not the instruction for cancelling printing, the processing proceeds to step S1916, and the CPU 212 determines whether an instruction (object 2002) for confirming the output paper size has been received in the dialogue of FIG. 20. If the instruction for confirming the output paper size has been accepted, the processing proceeds to step S1917, and if the instruction confirming the output paper size has not been accepted, the processing proceeds to step S1914. In step S1917, the CPU 212 discards the information of the page and the document size thereof held in step S1903 and the like and changes the output paper size of the print setting information of the received intermediate data to the output paper size selected in the dialogue of FIG. 20 and the processing proceeds to step S1919. In step S1919, the CPU 212 generates print data and print capability information according to the intermediate data. At this time, if the document size of the print setting information of a respective page is different from the setting of the output paper size, the print setting expansion application 312 generates print data enlarged or reduced to the paper size set in the output paper size as necessary. In addition, as the print capability information, the document size information is changed to the paper size set in the output paper size, and the processing is terminated.

In step S1902, if the setting of handling size-mixed printing in a single job is ON, the processing proceeds to step S1918. In step S1918, the CPU 212 determines whether the document sizes of all pages are paper sizes supported by the cloud printing compatible printer 104 based on the print setting information of the received intermediate data. If it is determined that the document sizes of all pages are paper sizes supported by the cloud printing compatible printer 104, the processing proceeds to step S1921. Meanwhile, if there is a page whose document size is a paper size not supported by the cloud printing compatible printer 104, the processing proceeds to step S1913, and a dialog for prompting selection of the output paper size illustrated in FIG. 20 is displayed, and the above-described processing is executed. In step S1921, the CPU 212 generates print data and print capability information for performing size-mixed printing in a single job according to the intermediate data received from the OS 313 and terminates the processing, similarly to step S1613. The above is the details of print data generation processing by the print setting expansion application 312 in the second embodiment.

In the second embodiment, even though the document sizes include a size not supported by the printer, if "match document size" is designated in the output paper size, the print setting expansion application 312 detects that when generating print data. Then, the user is prompted to change the setting or cancel printing. For this reason, as in the first embodiment, it can be expected that operations being performed on the cloud printing compatible printer 104 side and the user not noticing that output is not possible until they go to retrieve outputted paper, and the like, can be avoided.

In the second embodiment, in step S1903 or the like, a page or a paper size at the time of dividing a job is stored in the storage 214 of the client terminal 101 but may be stored in the memory 213 of the control unit 211.

In addition, regarding the divided jobs held at the point in time at which it is detected that the document size is not supported (it is determined No in step S1910), print data may be generated as is. In such a case, a configuration may be taken so as to generate print data for which the pages after the page for which it has been detected that the document size is not supported are outputted using the output paper size designated by the dialogue displayed in step S1913.

Third Embodiment

Next, a third embodiment according to the present invention will be described. In the third embodiment, even though the document sizes include a size not supported by the printer, if "match document size" is designated in the output paper size, the print setting expansion application 312 detects that when generating print data. Then, a change is automatically made so as to perform outputting in a paper size supported by the printer. Since the difference between the third embodiment and the first embodiment is the print data generation processing of the print setting expansion application 312, that part will be described with reference to FIGS. 21A and 21B. The description of other portions in common with the first embodiment will be omitted.

Figure 21A:
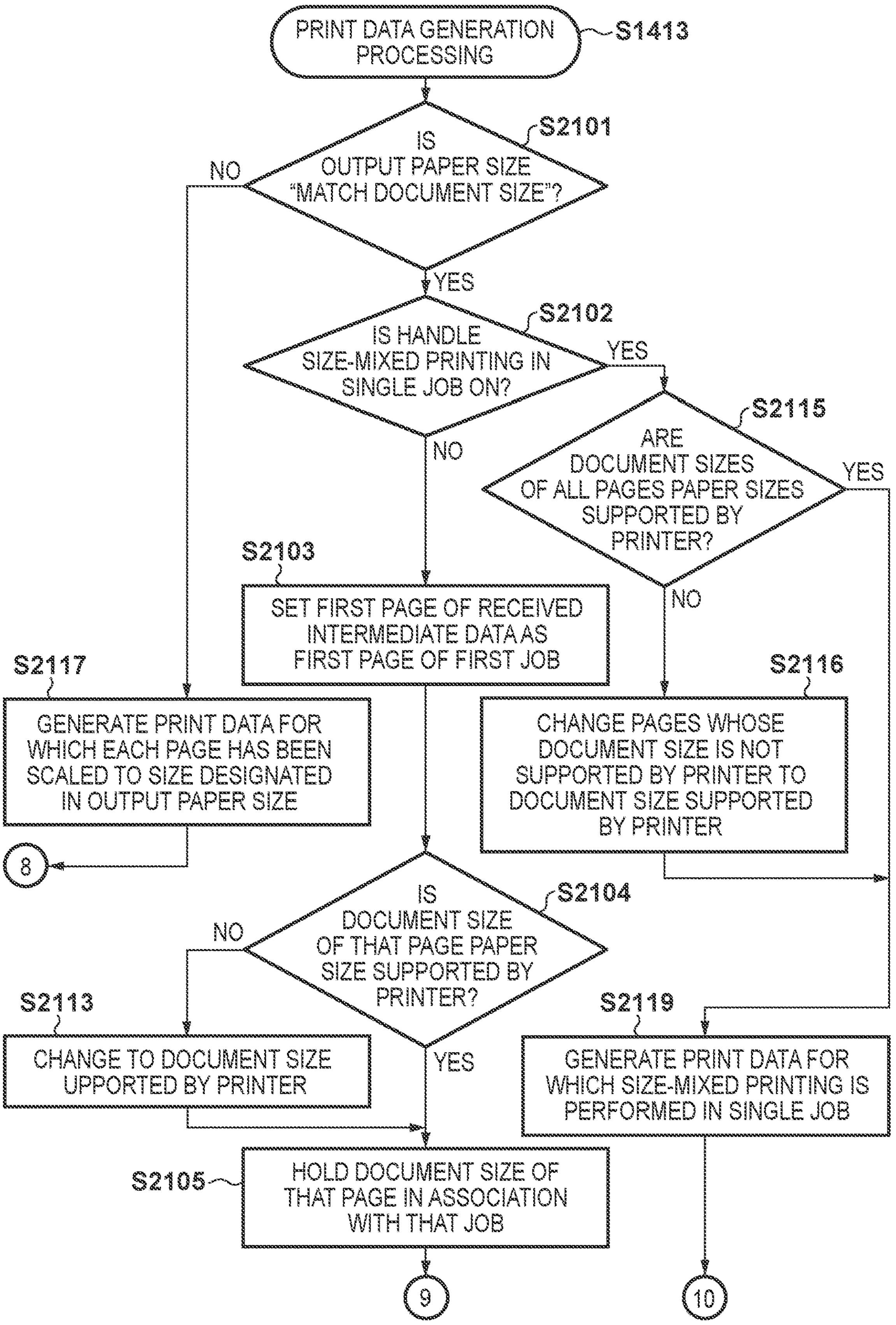
FIGS. 21A and 21B are flowcharts for explaining print data generation processing according to a third embodiment.
Figure 21B:
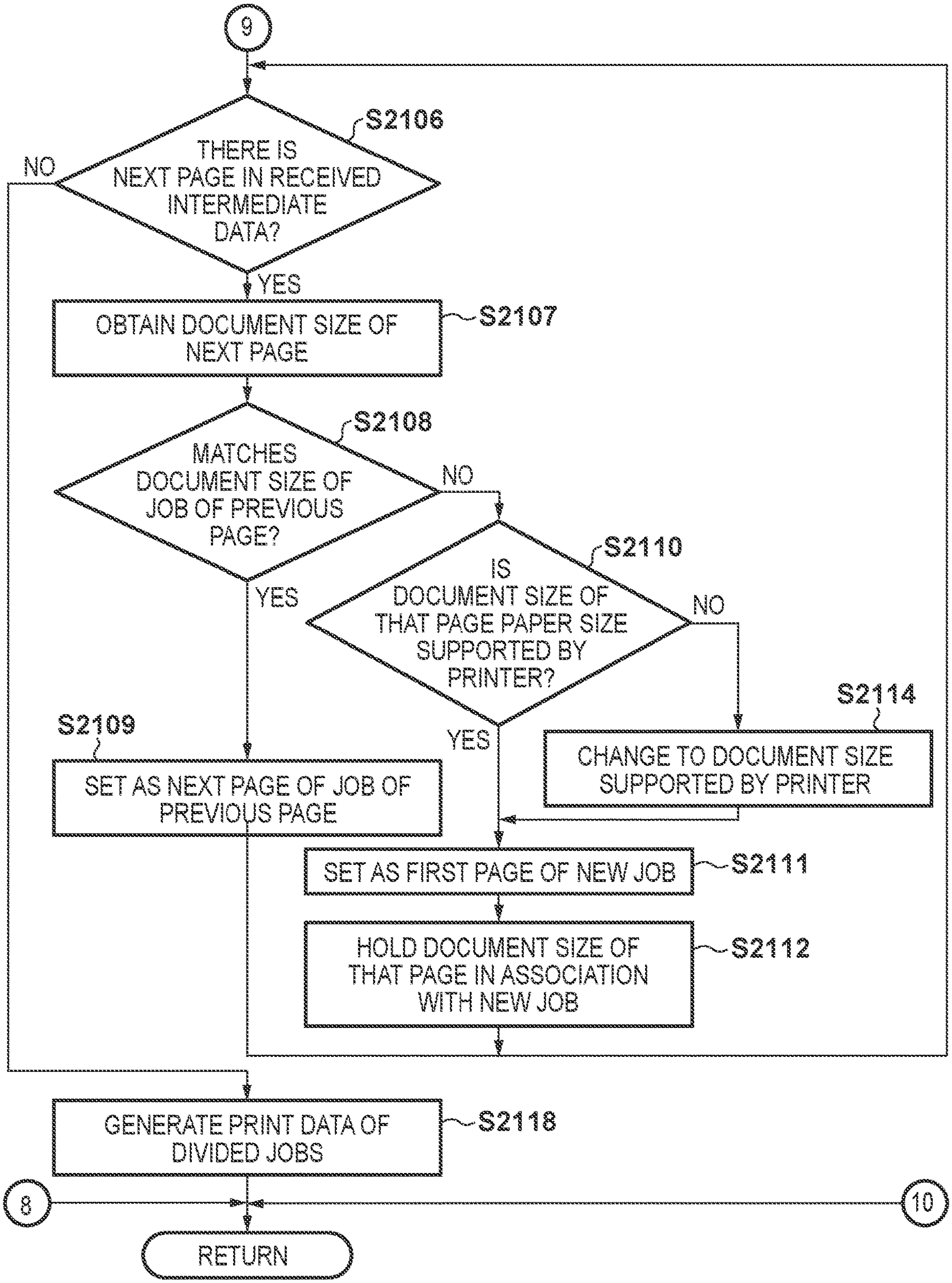

FIGS. 21A and 21B are flowcharts for explaining print data generation processing (corresponding to step S1413 of FIG. 14) according to the third embodiment. A program for executing the processing described in the flowchart is stored in the print setting expansion application 312, and the program is deployed in the memory 213 of the client terminal 101 and executed by the CPU 212.

First, in step S2101, the CPU 212 references print setting information of the intermediate data received from the OS 313 and determines whether the setting of the output paper size ("ns0000: PageOutputMediaSize") is "match document size". If the setting of the output paper size is "match document size", the processing proceeds to step S2102, and if the setting of the output paper size is other than "match document size", the processing proceeds to step S2117. In step S2117, the CPU 212 generates print data and print capability information according to the intermediate data. At this time, if the document size of the print setting information of respective pages is different from the setting of the output paper size, the print setting expansion application 312 generates print data enlarged or reduced to the paper size set in the output paper size as necessary and terminates the processing. In addition, as the print capability information, the document size information is changed to the paper size set in the output paper size.

In step S2102, the CPU 212 determines whether the setting for handling size-mixed printing in a single job ("ns0000: SingleJobMixedPageMediaSizePrint") is ON based on the print setting information of the intermediate data received from the OS 313. If the setting item is ON, the processing proceeds to step S2115, and if the setting item is OFF or the item itself is not present, the processing proceeds to step S2103. In step S2103, the CPU 212 references the intermediate data received from the OS 313 and stores the first page in the storage 214 as the first page of the first job according to the print order of pages. The processing of steps S2103 to S2114 is processing for realizing size-mixed printing by the print setting expansion application 312 dividing the job when the printer does not have the capability of handling size-mixed printing in a single job or the setting of handling size-mixed printing in a single job is OFF.

In step S2104, the CPU 212 determines whether the document size of the page held in step S2103 (paper size designated in "psk: PageMediaSize" of the print setting information of that page) is a paper size supported by the cloud printing compatible printer 104. If the paper size is supported by the cloud printing compatible printer 104, the processing proceeds to step S2105, and if the paper size is not supported by the cloud printing compatible printer 104, the processing proceeds to step S2113. In step S2113, the CPU 212 changes the document size of the page held in step S2103 to a paper size supported by the cloud printing compatible printer 104 and the processing proceeds to step S2105. Specifically, the paper size is changed to a paper size with the smallest difference from the original document size among the supported paper sizes.

In step S2105, the CPU 212 holds the document size of the page held in step S2103 in the storage 214 in association with the job. Next, the processing proceeds to step S2106, and the CPU 212 references the intermediate data received from the OS 313 and determines whether there is a next page according to the print order of pages. If there is the next page, the processing proceeds to step S2107, and if there is no next page, the processing proceeds to step S2118. In step S2107, the CPU 212 obtains the document size of the next page and the processing proceeds to step S2108. In step S2108, the CPU 212 references the document size obtained in step S2107 and determines whether the document size matches the document size held in association with the job of the previous page. If the document sizes are the same, the processing proceeds to step S2109, and if the document sizes are different from each other, the processing proceeds to step S2110. In step S2109, the CPU 212 holds the page for which the document size has been obtained in step S2107 as the next page of the job of the previous page in the storage 214 and the processing proceeds to S2106. In step S2118, the CPU 212 generates print data and print capability information for each job created in the processing of steps S2103 to S2114 and terminates the processing. At this time, the document size associated with each job is set as the document size of the print capability information of each job. In addition, assume that when there are pages whose document sizes have been changed in step S2113 or step S2114, print data for which the pages have been enlarged or reduced to the document sizes associated with respective jobs is generated.

In step S2110, the CPU 212 determines whether the document size obtained in step S2107 is a paper size supported by the cloud printing compatible printer 104. If the paper size is supported by the cloud printing compatible printer 104, the processing proceeds to step S2111, and if the paper size is not supported by the cloud printing compatible printer 104, the processing proceeds to step S2114. In step S2111, the CPU 212 holds the page for which the document size has been obtained in step S2107 as the first page of a new job, which is different from the job of the previous page, in the storage 214. Next, the processing proceeds to step S2112, and the CPU 212 holds the document size of the page held in step S2111 in the storage 214 in association with the new job of step S2111 and the processing returns to step S2106. In step S2114, the CPU 212 changes the document size of the page whose document size has been obtained in step S2107 to a paper size supported by the cloud printing compatible printer 104 and the processing proceeds to step S2111. The method of changing the paper size in step S2114 is similar to that of the processing of step S2113.

In addition, if the setting of handling size-mixed printing in a single job is turned ON in step S2102, the processing proceeds to step S2115, and the CPU 212 determines whether the document sizes of all pages are paper sizes supported by the cloud printing compatible printer 104 based on the print setting information of the received intermediate data. If the document sizes of all pages are paper sizes supported by the cloud printing compatible printer 104, the processing proceeds to step S2119, and if there is a page whose document size is a paper size not supported by the cloud printing compatible printer 104, the processing proceeds to step S2116. In step S2116, the CPU 212 changes the document size of the page whose document size is a paper size not supported by the cloud printing compatible printer 104 to a paper size supported by the cloud printing compatible printer 104 and the processing proceeds to step S2119. The method of changing the paper size here is similar to that of the processing of step S2113. In step S2119, if there is a page whose document size has been changed in step S2116, the CPU 212 enlarges or reduces the page to the changed document size and, similarly to step S1613, generates print data for size-mixed printing in a single job and the print capability information and terminates the processing.

The above is the details of print data generation processing by the print setting expansion application 312 according to the third embodiment.

According to the third embodiment, when output to a paper size not supported by the printer is instructed, the print setting expansion application 312 detects this when generating the print data and automatically changes the document size so as to be outputted in a paper size supported by the printer. Thus, as in the first embodiment and the second embodiment, it is possible to reduce the effort of setting the output paper size after an instruction for printing. In the third embodiment, in step S2103 or the like, a page or a paper size at the time of dividing a job is stored in the storage 214 of the client terminal 101 but may be stored in the memory 213.

Various methods are conceivable as the method of changing the document size in step S2113. For example, the print setting expansion application 312 identifies whether the paper size designated as the original document size is an A size (A size of ISO) or a B size (B size of JIS). If an A-size paper size is designated, a change to an A-size paper size supported by the printer may be made, and if a B-size paper size is designated, a change to a B-size paper size supported by the printer may be made. For example, a change to the default value of the paper size predetermined in the capability information of the printer may be made.

Fourth Embodiment

Next, a fourth embodiment according to the present invention will be described. In the fourth embodiment, as a printing protocol, assume that print data for which print settings can be switched in units of documents included in one job can be transmitted to the printer. Assume that when the printer has the capability of handling size-mixed printing in a single job, the printer can switch the print settings for each document included in one job. In addition, a difference from the first embodiment is processing in which the print setting expansion application 312 receives intermediate data from the OS 313 and generates print data, and therefore that part will be described with reference to FIGS. 22A and 22B.

Figure 22A:
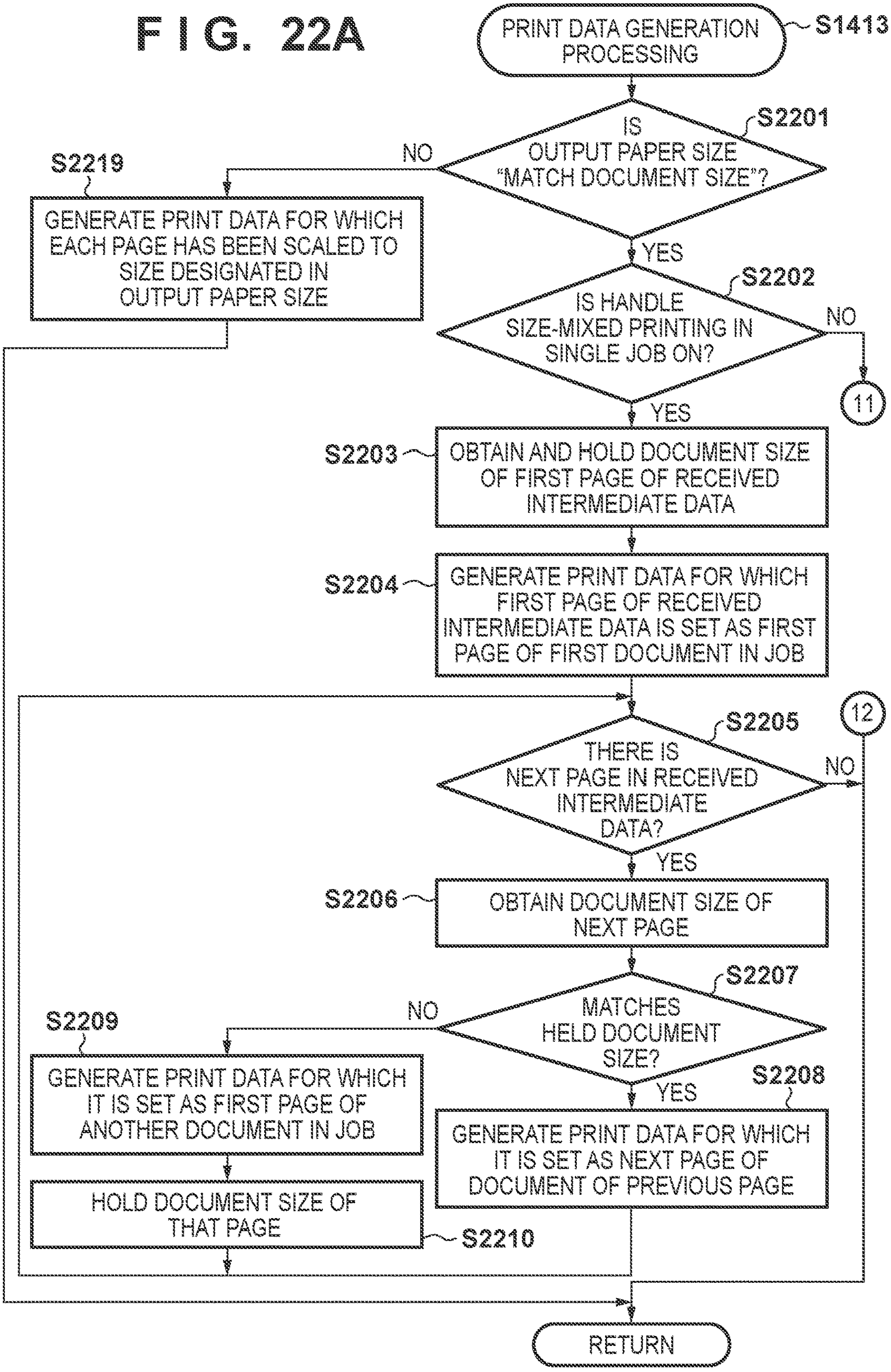
FIGS. 22A and 22B are flowcharts for explaining print data generation processing according to a fourth embodiment.
Figure 22B:
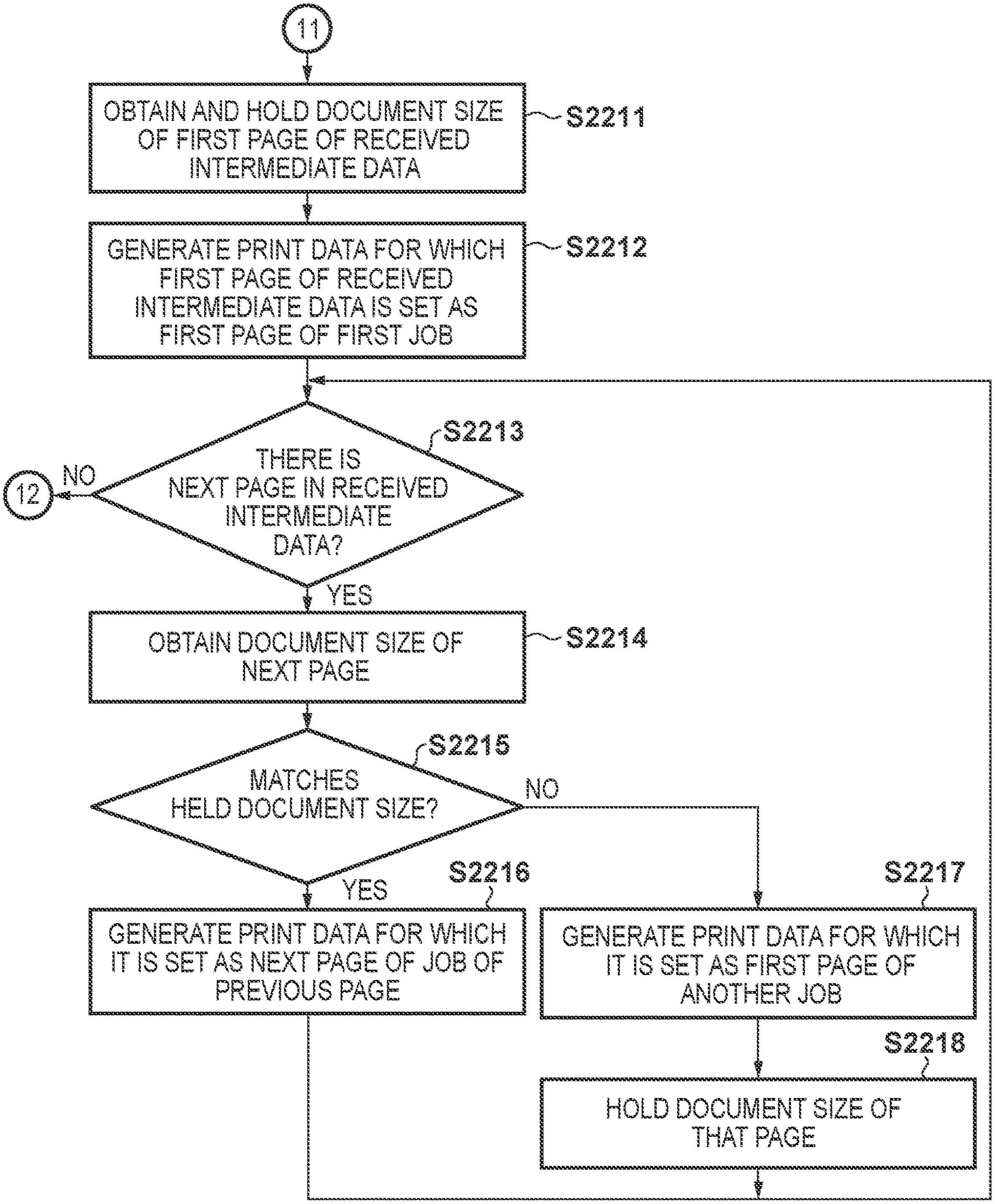

FIGS. 22A and 22B are flowcharts for explaining print data generation processing (corresponding to step S1413 of FIG. 14) according to the fourth embodiment. A program for executing the processing described in the flowchart is stored in the print setting expansion application 312, and the program is deployed in the memory 213 of the client terminal 101 and executed by the CPU 212.

In step S2201, the CPU 212 references print setting information of the intermediate data received from the OS 313 and determines whether the setting of the output paper size ("ns0000: PageOutputMediaSize") is "match document size". If the setting of the output paper size is "match document size", the processing proceeds to step S2202, and if the setting of the output paper size is other than "match document size", the processing proceeds to step S2219. In step S2219, the CPU 212 generates print data and print capability information according to the intermediate data and terminates the processing, similarly to step S1611.

In step S2202, the CPU 212 determines whether the setting for handling size-mixed printing in a single job ("ns0000: SingleJobMixedPageMediaSizePrint") is ON based on the print setting information of the intermediate data received from the OS 313. If the setting item is ON, the processing proceeds to step S2203, and if the setting item is OFF or the item itself is not present, the processing proceeds to step S2211.

In step S2203, the CPU 212 references the intermediate data received from the OS 313, obtains the document size from the print setting information of the first page according to the print order of pages, stores the document size in the memory 213, and the processing proceeds to step S2204. In step S2204, the CPU 212 generates print data for which the page for which the document size has been obtained in step S2203 is the first page of the first document in a job and holds the print data in the storage 214. At this time, the document size obtained in step S2203 is set as the document size of the print capability information of the document. Next, the processing proceeds to step S2205, and the CPU 212 references the intermediate data received from the OS 313 and determines whether there is a next page according to the print order of pages. Here, if there is the next page, the processing proceeds to step S2206, and if there is no next page, the print data generation processing is terminated.

In step S2206, the CPU 212 obtains the document size of the page that is determined to be present in step S2205 and the processing proceeds to step S2207. In step S2207, the CPU 212 determines whether the document size obtained in step S2206 matches the held document size. If it is determined that the document sizes are the same, the processing proceeds to step S2208, and if it is determined that the document sizes are different from each other, the processing proceeds to step S2209. In step S2208, the CPU 212 updates the held print data such that the page for which the document size has been obtained in step S2206 is the next page of the document of the previous page and the processing returns to step S2205. Accordingly, if the document sizes are the same, print data of a document with consecutive pages is generated. Meanwhile, in step S2209, the CPU 212 updates the held print data such that the page for which the document size has been obtained in step S2206 is the first page of a new document, which is different from the document of the previous page. At this time, the document size obtained in step S2206 is set as the document size of the print capability information of the new document. Next, the processing proceeds to step S2210, and the CPU 212 newly holds the document size obtained in step S2206 in place of the held document size and the processing returns to step S2205.

In addition, if the setting of handling size-mixed printing in a single job is OFF or if the setting item itself is not present in step S2202, the processing proceeds to step S2211. In step S2211, the CPU 212 references the intermediate data received from the OS 313, obtains the document size from the print setting information of the first page according to the print order of pages, and stores the document size in the memory 213. Next, the processing proceeds to step S2212, and the CPU 212 generates print data for which the page for which the document size has been obtained in step S2211 is the first page of the document in the first job and holds the print data in the storage 214. At this time, the document size obtained in step S2211 is set as the document size of the print capability information of the job. Next, the processing proceeds to step S2213, and the CPU 212 references the intermediate data received from the OS 313 and determines whether there is a next page according to the print order of pages. Here, if there is the next page, the processing proceeds to step S2214, and if there is no next page, the print data generation processing is terminated. In step S2214, the CPU 212 obtains the document size of the page that is determined to be present in step S2213 and the processing proceeds to step S2215. In step S2215, the CPU 212 determines whether the document size obtained in step S2214 matches the held document size. If it is determined that the document sizes are the same, the processing proceeds to step S2216, and if it is determined that the document sizes are different from each other, the processing proceeds to step S2217. In step S2216, the CPU 212 updates the held print data such that the page for which the document size has been obtained in step S2214 is the next page of the document of the job including the previous page and the processing returns to step S2213.

Meanwhile, in step S2217, the CPU 212 updates the held print data such that the page for which the document size has been obtained in step S2214 as the first page of a document of a new job, which is different from the job including the previous page. At this time, the document size obtained in step S2214 is set as the document size of the print capability information of the new job. Next, the processing proceeds to step S2218, and the CPU 212 newly holds the document size obtained in step S2214 in place of the held document size and the processing proceeds to step S2213. The above is the details of print data generation processing related to a size-mixed printing function in the fourth embodiment.

According to the fourth embodiment, when the printer has the capability of handling size-mixed printing in a single job, the printer does not need to interpret the document size of each page from the print data as in the first embodiment, and the load on the printer can be reduced compared with the first embodiment. Similarly to the first embodiment, even when the printer does not have the capability of handling size-mixed printing in a single job, size-mixed printing can be realized by dividing the job. In the fourth embodiment, the document size is stored in the memory 213 of the client terminal 101 in step S2203 or the like but may be stored in the storage 214. The print data is stored in the memory 213 of the client terminal 101 in step S2204 or the like but may be stored in the storage 214.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-060441, filed Apr. 3, 2023, which is hereby incorporated by reference herein in its entirety.

What is claimed is:

1. An information processing apparatus comprising:

one or more controllers including one or more processors and one or more memories, the one or more controllers configured to:

update device capability information stored in advance in an operating system with capability information obtained from a printer so the device capability information including information regarding an output paper size and a document size, the output paper size information being added to the device capability information based on a paper size capability in the capability information obtained from the printer, and the document size information being added to the device capability information using predetermined information including a paper size not included in the capability information obtained from the printer;

receive setting of print setting information based on the updated device capability information from a user, the print setting information including settings regarding an output media size and a document size;

obtain intermediate data generated by the operating system based on the print setting information; and generate print data based on the intermediate data, the intermediate data being data of the document size, and the print data being data of the output paper size.

2. The information processing apparatus according to claim 1, wherein the one or more controllers are configured to: execute the update of the device capability information based on an event notification registered in the operating system of the information processing apparatus.

3. The information processing apparatus according to claim 1, wherein in the setting, the one or more controllers are configured to: display a print setting screen based on the updated device capability information and prompt a user to set the print setting information via the print setting screen.

4. The information processing apparatus according to claim 3, wherein in the update, the one or more controllers further update the device capability information so as to include, as the output paper size capability, an option for performing printing using a paper size set for each page, in the setting, the one or more controllers allow the option to be selected as the output paper size in the print setting screen, and in the generation, the one or more controllers, in a case where a setting of the output paper size included in the intermediate data is the option, generate print data for which each page of the intermediate data is printed in a size of paper set for that page and, in a case where the setting of the output paper size included in the intermediate data is information indicating a paper size, generate print data for which each page of the intermediate data is printed in the size of paper set in the output paper size.

5. The information processing apparatus according to claim 4, wherein in the generation, the one or more controllers, in a case where the option is set as the output paper size and a setting of handling size-mixed printing in a single job is not made, divide the intermediate data at a page at which a paper size changes in a print order of pages, the paper size being set for each page included in the intermediate data, and generate print data based on the divided intermediate data.

6. The information processing apparatus according to claim 4, wherein in the generation, the one or more controllers, in a case where the option is set as the output paper size and a setting of handling size-mixed printing in a single job is made, generate print data including a paper size set for each page of the intermediate data and a setting of performing the size-mixed printing.

7. The information processing apparatus according to claim 5, wherein in the update, the one or more controllers, in a case where the capability information obtained from the printer does not include the setting of handling size-mixed printing in a single job, delete the setting of handling size-mixed printing in a single job included in the device capability information stored in the operating system.

8. The information processing apparatus according to claim 4, wherein a setting according to the option includes a setting of matching the output paper size to a document size of a page.

9. The information processing apparatus according to claim 4, wherein in the generation, the one or more controllers, in a case where it is detected that the obtained intermediate data is intermediate data for generating print data for which output is performed in a paper size not supported by the printer, cancel printing or display a screen for accepting a change of the output paper size.

10. The information processing apparatus according to claim 4, wherein in the generation, the one or more controllers, in a case where it is detected that the obtained intermediate data is intermediate data for generating print data for which output is performed in a paper size not supported by the printer, automatically change a size of paper to be outputted.

11. The information processing apparatus according to claim 10, wherein in the generation, the one or more controllers change the size of paper to be outputted to a paper size supported by the printer.

12. The information processing apparatus according to claim 1, wherein in the generation, the one or more controllers, in a case where a setting of handling size-mixed printing in a single job is included, when a paper size set to a page included in the intermediate data matches a paper size of a previous page, generate print data in which pages are consecutive and, when the paper size set to the page included in the intermediate data is different from the paper size of the previous page, generate print data that starts with one page.

13. A method of controlling an information processing apparatus, the method comprising:

updating device capability information stored in advance in an operating system with capability information obtained from a printer so the device capability information includes information regarding an output paper size and a document size, the output paper size information being added to the device capability information based on a paper size capability in the capability information obtained from the printer, and the document size information being added to the device capability information using predetermined information including a paper size not included in the capability information obtained from the printer;

prompting a user to set print setting information based on the updated device capability information from a user, the print setting information including settings regarding an output media size and a document size;

obtaining intermediate data generated by the operating system based on the print setting information; and generating print data based on the intermediate data, the intermediate data being data of the document size, and the print data being data of the output paper size.

14. A non-transitory computer-readable storage medium storing a program for causing a processor to execute a method of controlling an information processing apparatus, the method comprising:

updating device capability information stored in advance in an operating system with capability information obtained from a printer so the device capability information includes information regarding an output paper size and a document size, the output paper size information being added to the device capability information based on a paper size capability in the capability information obtained from the printer, and the document size information being added to the device capability information using predetermined information including a paper size not included in the capability information obtained from the printer;

prompting a user to set print setting information based on the updated device capability information from a user, the print setting information including settings regarding an output media size and a document size;

obtaining intermediate data generated by the operating system based on the print setting information; and generating print data based on the intermediate data, the intermediate data being data of the document size, and the print data being data of the output paper size.

* * * * *